US009742897B2

(12) United States Patent
Sakai

(10) Patent No.: US 9,742,897 B2
(45) Date of Patent: Aug. 22, 2017

(54) COMMUNICATION APPARATUS, METHOD OF CONTROLLING THE SAME, AND NON-TRANSITORY COMPUTER-READABLE STORAGE MEDIUM

(71) Applicant: CANON KABUSHIKI KAISHA, Tokyo (JP)

(72) Inventor: Tomoya Sakai, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/212,449

(22) Filed: Jul. 18, 2016

(65) Prior Publication Data
US 2017/0034329 A1    Feb. 2, 2017

(30) Foreign Application Priority Data

Jul. 28, 2015  (JP) ................. 2015-148847

(51) Int. Cl.
| | |
|---|---|
| H04B 1/38 | (2015.01) |
| H04M 1/725 | (2006.01) |
| H04W 4/00 | (2009.01) |
| H04W 4/02 | (2009.01) |
| H04W 76/02 | (2009.01) |

(52) U.S. Cl.
CPC ......... *H04M 1/7253* (2013.01); *H04W 4/008* (2013.01); *H04W 4/025* (2013.01); *H04W 76/027* (2013.01); *Y02B 60/50* (2013.01)

(58) Field of Classification Search
USPC ... 455/41.1, 41.2, 41.3, 435.1, 435.2, 552.1, 455/553.1; 348/207.1, 207.2, 211.1, 348/211.2
See application file for complete search history.

(56) References Cited

U.S. PATENT DOCUMENTS

| | | |
|---|---|---|
| 2015/0245298 A1 | 8/2015 | Takahashi et al. |
| 2016/0353513 A1 | 12/2016 | Taniguchi et al. |
| 2017/0006125 A1 | 1/2017 | Yasuma et al. |
| 2017/0006546 A1 | 1/2017 | Sakai et al. |

FOREIGN PATENT DOCUMENTS

JP    2006-115024 A    4/2006

OTHER PUBLICATIONS

Specification of the Bluetooth System (ver. 4.0), Bluetooth SIG, Inc., Jun. 30, 2010, pp. 1-2302 (https://www.bluetooth.org/apps/content/).

*Primary Examiner* — Quochien B Vuong
(74) *Attorney, Agent, or Firm* — Carter, DeLuca, Farrell & Schmidt, LLP

(57) ABSTRACT

A communication apparatus stores data to a storage unit, receives a first request signal from a first other communication apparatus by a wireless communication that complies with a first communication method, determines, if the first request signal is received, whether or not target data to be transmitted is stored in the storage unit, performs, if the target data is determined to be stored in the storage unit, connection processing by using a wireless communication that complies with a second communication method different from the first communication method, and transmits, if the connection processing is performed, target data by using the wireless communication that complies with the second communication method, wherein if the target data is determined to not be stored in the storage unit, the connection processing is not performed.

15 Claims, 24 Drawing Sheets

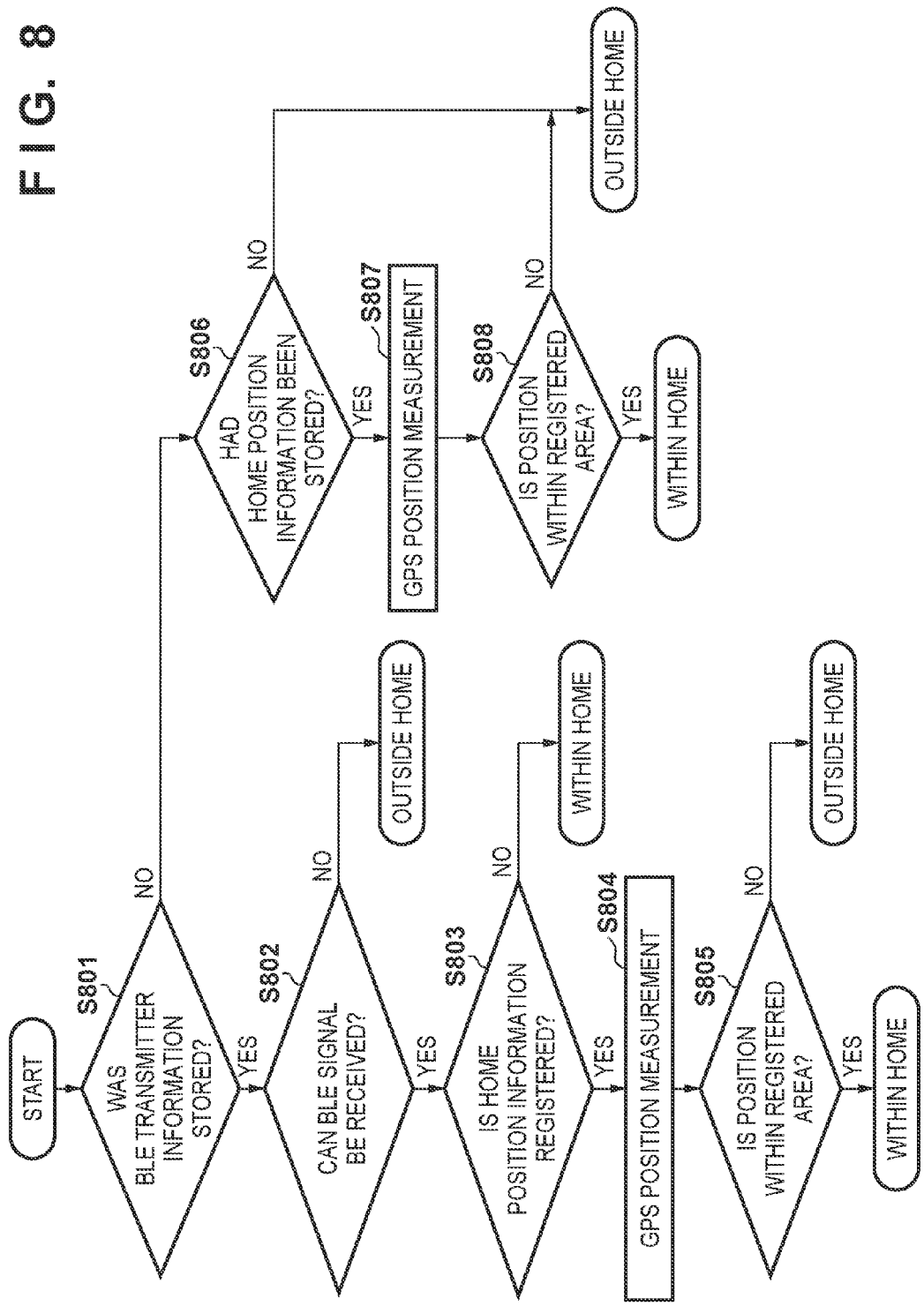

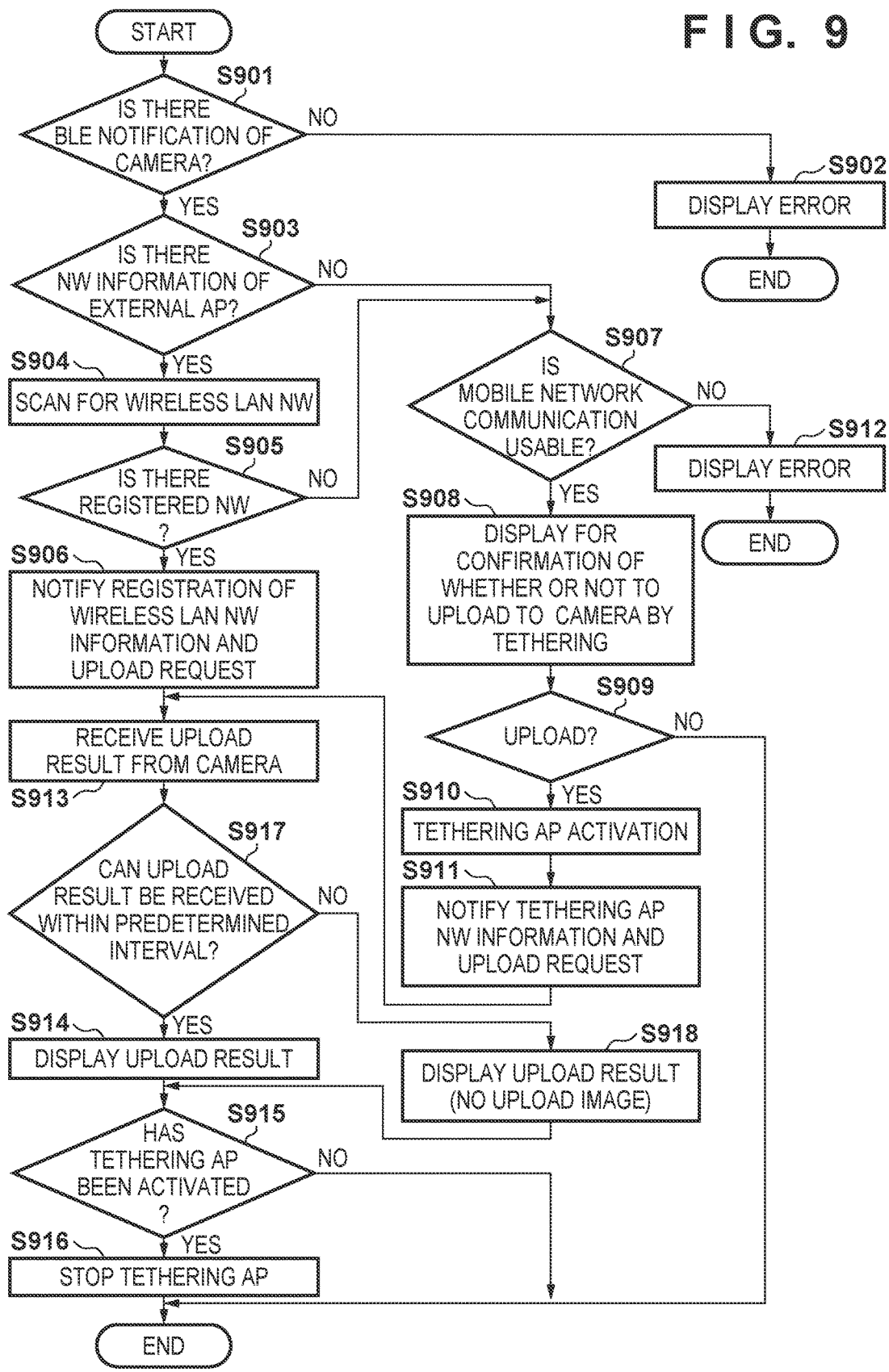

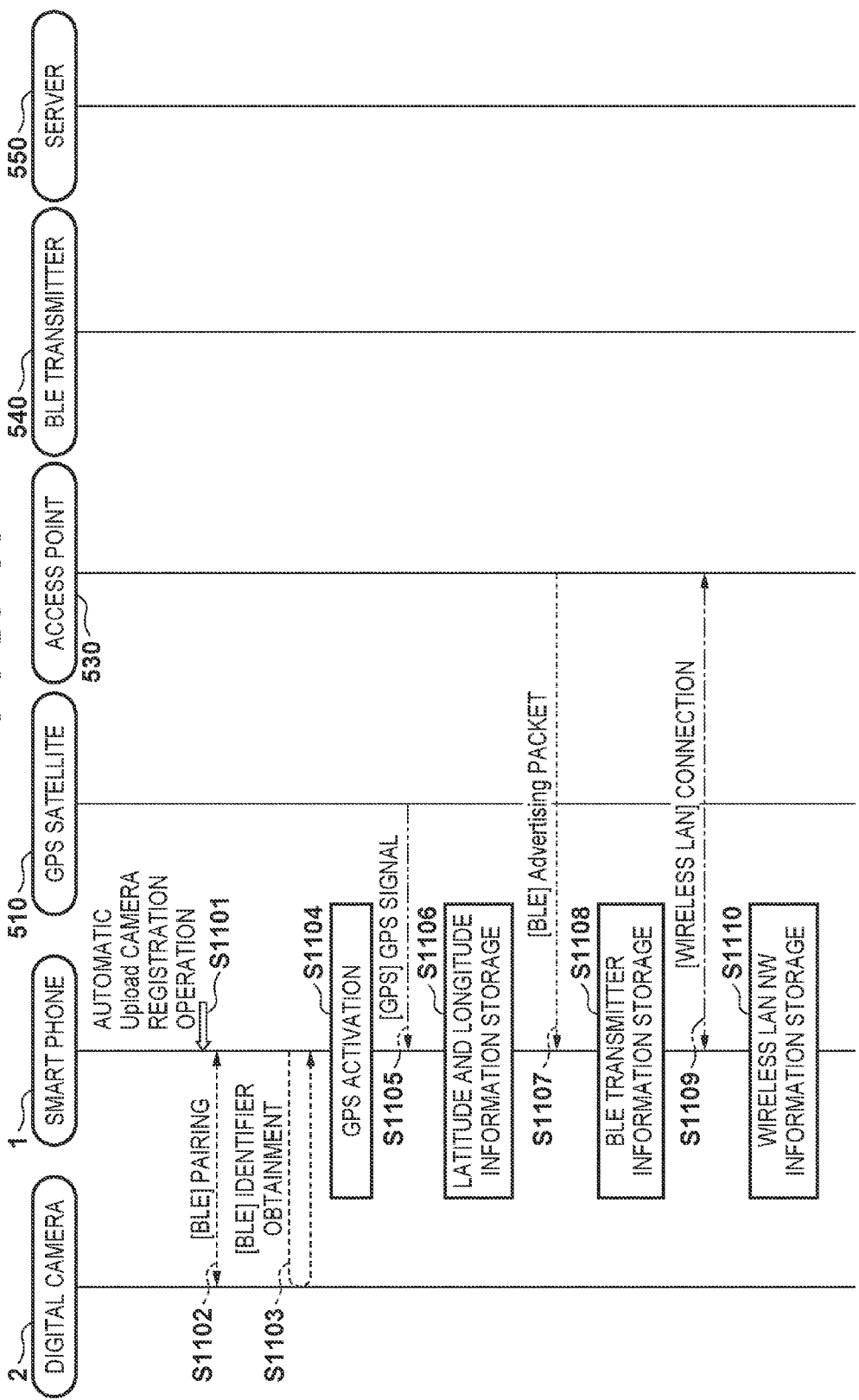

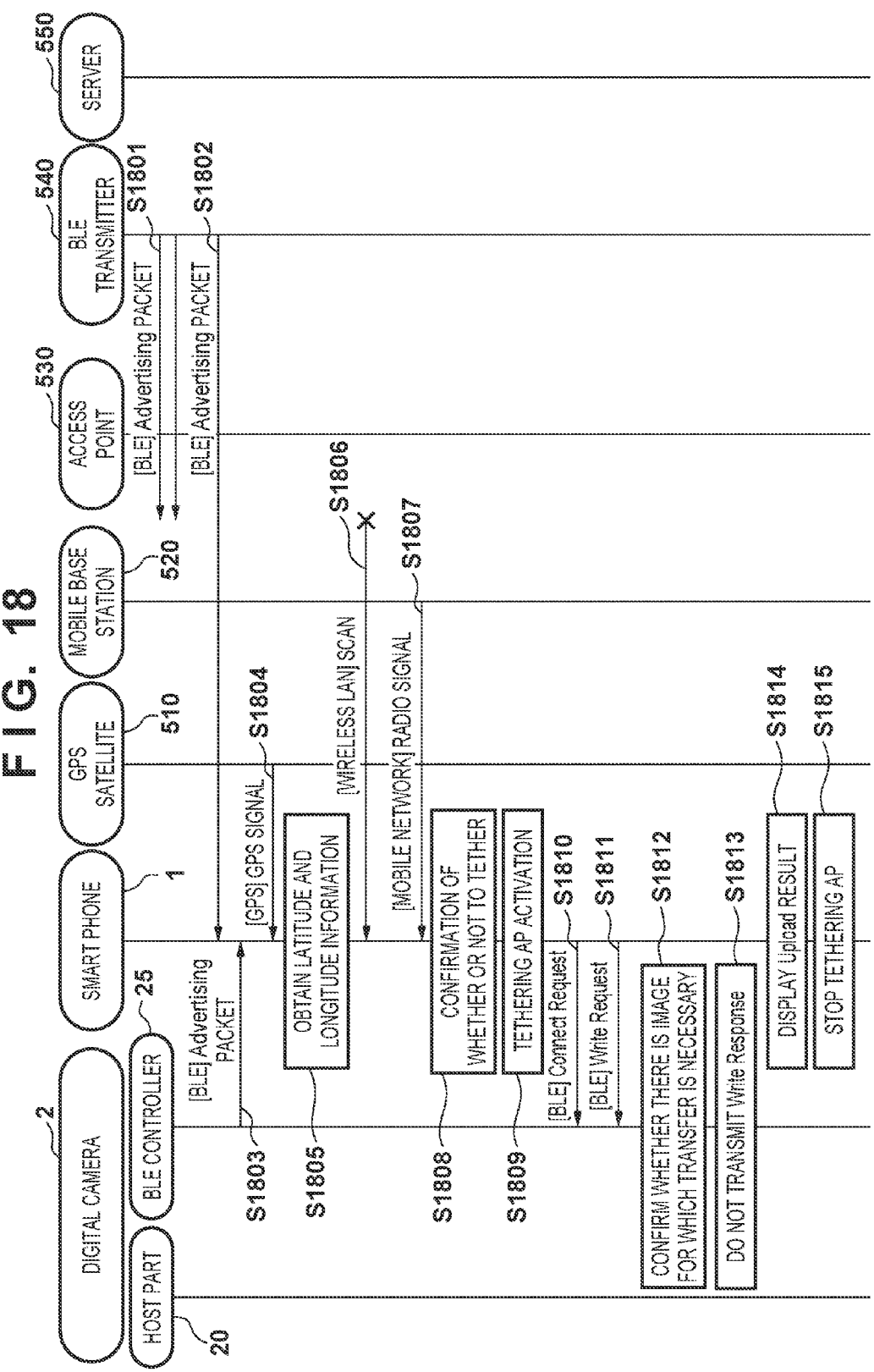

FIG. 20A

| MEDIA DATA NO. | TRANSFER NECESSITY |
|---|---|
| 0001 | UNNECESSARY |
| 0002 | UNNECESSARY |
| 0003 | UNNECESSARY |
| 0004 | NECESSARY |
| 0005 | NECESSARY |
| 0006 | NECESSARY |

FIG. 20B

| MEDIA DATA NO. | TRANSFER NECESSITY |
|---|---|
| 0001 | UNNECESSARY |
| 0002 | UNNECESSARY |
| 0003 | UNNECESSARY |
| 0004 | NECESSARY |
| 0005 | NECESSARY |
| 0006 | NECESSARY |
| 0007 | NECESSARY |

FIG. 20C

| MEDIA DATA NO. | TRANSFER NECESSITY |
|---|---|
| 0001 | UNNECESSARY |
| 0002 | UNNECESSARY |
| 0003 | UNNECESSARY |
| 0004 | UNNECESSARY |
| 0005 | UNNECESSARY |
| 0006 | UNNECESSARY |
| 0007 | UNNECESSARY |

FIG. 21A

Characteristics OF Station SERVICE
*R[READABLE], W[WRITABLE], N[NOTIFIABLE]

| Characteristics | OPERATION POSSIBLE FROM THE SMART PHONE* |
|---|---|
| FOR WRITING | W |
| FOR ERROR PROCESSING FLAG | W/R |

FIG. 21B

Characteristics OF AP SERVICE
*R[READABLE], W[WRITABLE], N[NOTIFIABLE]

| Characteristics | OPERATION POSSIBLE FROM THE SMART PHONE* |
|---|---|
| FOR WRITING | W |
| FOR STATUS NOTIFICATION | W |
| SSID | R |
| PASSPHRASE | R |
| ENCRYPTION METHOD | R |

COMMUNICATION APPARATUS, METHOD OF CONTROLLING THE SAME, AND NON-TRANSITORY COMPUTER-READABLE STORAGE MEDIUM

BACKGROUND OF THE INVENTION

Field of the Invention

The present invention relates to a communication apparatus capable of communicating with an external apparatus, a method of controlling the same, and a non-transitory computer-readable storage medium.

Description of the Related Art

In digital cameras in which a wireless Local Area Network (LAN) function is installed, there are many that are equipped with a function for transferring, to a server apparatus on the Internet using the wireless LAN function, a media file such as an imaged and recorded still image/moving image. By using such a function as a data backup, a user can reduce the risk of losing imaging data due to the loss of the digital camera or a memory card or the like. Also, by combining such a function with a tethering function that a communication apparatus such as a smart phone is equipped with, it becomes possible to backup imaged media data on a server even if no wireless LAN network by which to connect to the Internet is present.

In Japanese Patent Laid-Open No. 2006-115024, a technique is disclosed in which in a digital camera in which a wireless LAN function is installed, digital camera power saving is performed by detecting a wireless LAN access point (AP) and transferring untransferred images thereto only in cases where there is untransferred image data. Also, Bluetooth Low Energy (hereinafter BLE), by which lower power consumption communication compared to wireless LAN is possible, has been standardized as a part of the Bluetooth 4.0 specification (Bluetooth SIG (https://www-.bluetooth.org/apps/content/) SPECIFICATION OF THE BLUETOOTH SYSTEM (ver. 4.0)). In recent years, smart phone that support a BLE communication function have spread, and there are digital cameras that communicate with smart phones using BLE.

However, in the method of Japanese Patent Laid-Open No. 2006-115024, there was a problem in that in a case when a digital camera which has an untransferred image in a server apparatus performed a scan for an AP, power was consumed in a state in which no AP was found.

SUMMARY OF THE INVENTION

The present invention was conceived in view of the above described problem, and provides an apparatus that is able to communicate with an external apparatus and is capable of reducing power consumption.

According to one aspect of the present invention, there is provided a communication apparatus which comprises: a storage unit configured to store data; a reception unit configured to receive a first request signal from a first other communication apparatus by a wireless communication that complies with a first communication method; a determination unit configured to determine, if the first request signal is received, whether or not target data to be transmitted is stored in the storage unit; a connection unit configured to, if the target data is determined to be stored in the storage unit, perform connection processing by using a wireless communication that complies with a second communication method different from the first communication method; and a transmission unit configured to, if the connection processing is performed by the connection unit, transmit target data by using the wireless communication that complies with the second communication method, wherein if the target data is determined to not be stored in the storage unit, the connection unit does not perform the connection processing.

Further features of the present invention will become apparent from the following description of exemplary embodiments (with reference to the attached drawings).

BRIEF DESCRIPTION OF THE DRAWINGS

FIG. 8 illustrates an operational flow of the communication apparatus (smart phone) according to the embodiment.

FIG. 9 illustrates an operational flow of the communication apparatus (smart phone) according to the embodiment.

FIG. 11 illustrates an exemplified communication sequence between each device according to the embodiment.

FIG. 18 illustrates an exemplified communication sequence between each device according to the embodiment.

FIG. 20A-FIG. 20C are tables which illustrate whether the transfer of media data in the digital camera is necessary or not.

FIG. 21A-FIG. 21B are data formats of the data areas of the Station service or AP service according to the embodiment.

DESCRIPTION OF THE EMBODIMENTS

Below, with reference to the attached drawings, a detailed explanation is given for the present invention based on embodiments. Note that configurations shown in the following embodiments are merely examples, and the present invention is not limited to the illustrated configurations.

Figure 5:
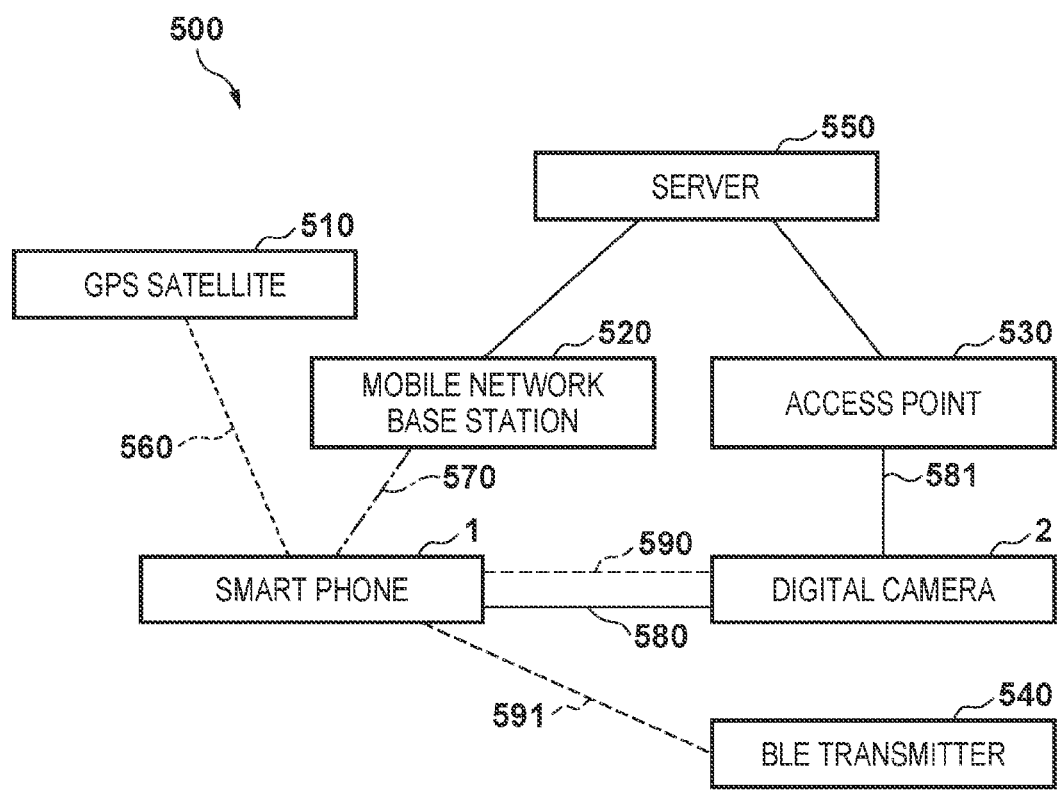
FIG. 5 illustrates an exemplified system configuration according to the embodiment.

FIG. 5 illustrates an exemplified configuration of a system 500 envisioned in the present embodiment explained below. A smart phone 1 is capable of communicating with a digital camera 2 using a wireless communication which complies with a first communication method and a wireless communication which complies with a second communication method. In the present embodiment, the smart phone 1 is capable of connecting to the digital camera 2 via Bluetooth Low Energy (BLE) communication 590 as the first communication method and wireless Local Area Network (LAN) communication 580 as the second communication method. Note, the smart phone 1 is an example of a communication apparatus and the digital camera 2 is an example of an imaging apparatus. Note, the second communication method may be the communication method that complies with an IEEE 802.11 series standard.

The smart phone 1 receives a GPS signal 560 notified from a Global Positioning System (GPS) satellite 510. Also, the smart phone 1 is capable of connecting to a mobile network base station 520 via a mobile network communication 570. The digital camera 2 is capable connecting to an access point 530 via a wireless LAN communication 581. A BLE transmitter 540 is a communication device which transmits a specific Universal Unique Identifier (UUID) and version information by a BLE advertising message. The smart phone 1 receives the message from the BLE transmitter 540 via a BLE communication 591. The mobile network base station 520 and the access point 530 are connected to a server 550 which exists on the Internet.

Figure 1:
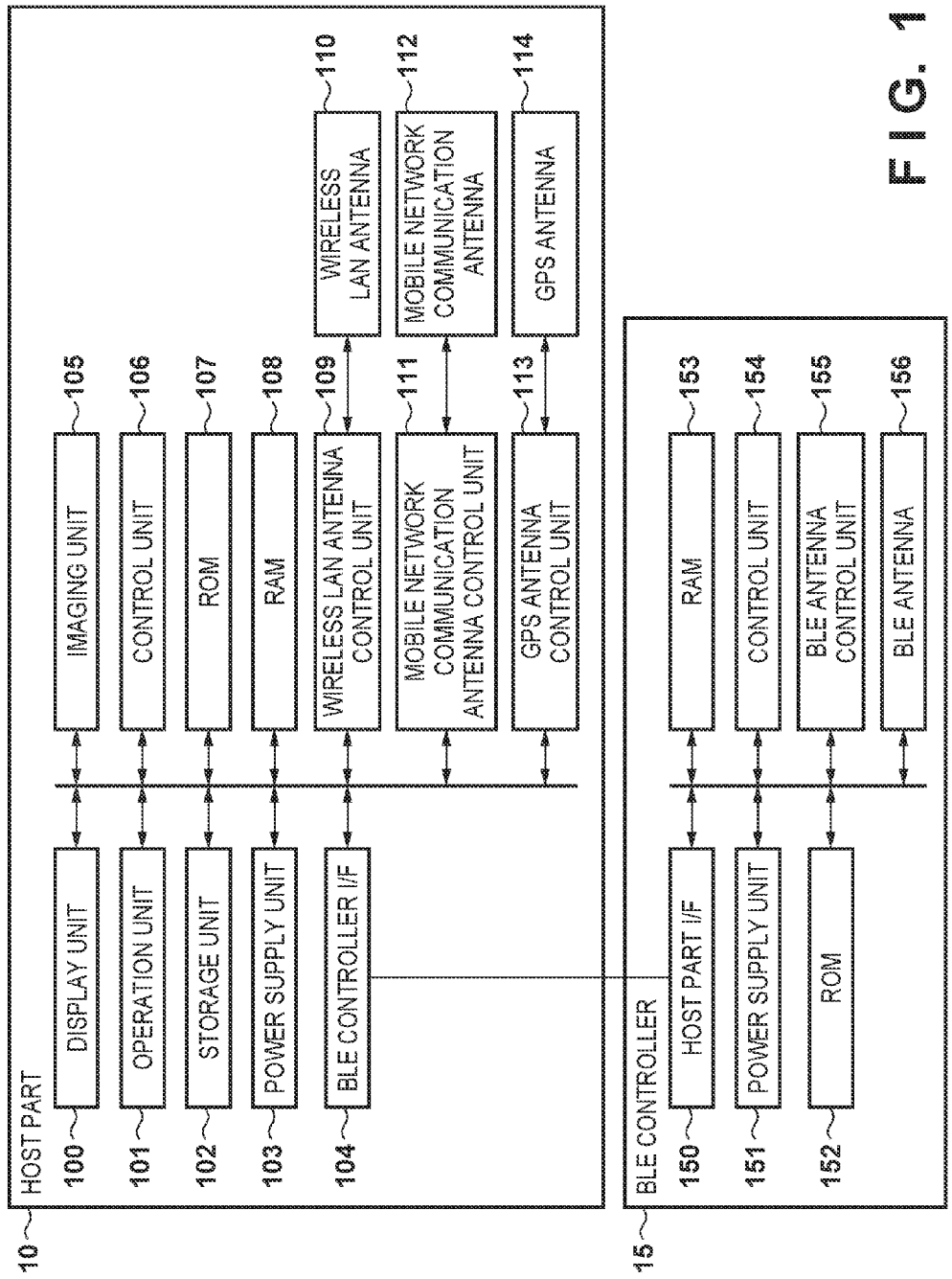
FIG. 1 illustrates an example of a hardware configuration of a communication apparatus (a smart phone) according to an embodiment.

FIG. 1 illustrates an example of a hardware configuration of a communication apparatus (the smart phone 1) in the present embodiment. The smart phone 1 is configured by a host part 10 and a BLE Controller 15. The host part 10 is equipped with a display unit 100, an operation unit 101, a storage unit 102, a power supply unit 103, a BLE controller interface (I/F) 104, an imaging unit 105, a control unit 106, a ROM 107, and a RAM 108. The host part 10 also is equipped with a wireless LAN antenna control unit 109, a wireless LAN antenna 110, a mobile network communication antenna control unit 111, a mobile network communication antenna 112, a GPS antenna control unit 113, and a GPS antenna 114.

The display unit 100 and the operation unit 101 perform display, execution, and the like of an application. The storage unit 102 stores and manages various data such as wireless communication network information, data transmission/reception information, image data, and the like. The power supply unit 103 supplies power of the host part 10 by a battery for example. A BLE controller I/F 104 is an interface which is connected to a BLE controller 15. The imaging unit 105 performs imaging of a moving image or a photo. The control unit 106, which is a Central Processing Unit (CPU) for example, controls operation of each configuration element of the smart phone 1. The Read Only Memory (ROM) 107 stores control commands i.e. a program. The Random Access Memory (RAM) 108 is used as a work memory and to temporarily save data and the like when the program is executed. The wireless LAN antenna control unit 109 controls the wireless LAN antenna 110 and performs wireless LAN communication 580. The mobile network communication antenna control unit 111 controls the mobile network communication antenna 112 and performs the mobile network communication 570. The GPS antenna control unit 113 controls the GPS antenna 114 and receives the GPS signal 560 from a GPS satellite 510.

The BLE controller 15 is equipped with a host part I/F 150, a power supply unit 151, a ROM 152, a RAM 153, a control unit 154, a BLE antenna control unit 155, and a BLE antenna 156. The host part I/F 150 is an interface which is connected to the host part 10. The power supply unit 151 supplies power of the BLE controller 15 by a battery for example. The ROM 152, since it stores control commands i.e. a program, especially here stores programs according to the BLE communication. The RAM 153 is used as a work memory and to temporarily save data and the like when the program is executed. The control unit 154, which is a CPU for example, controls an operation of each configuration element of the BLE controller 15. The BLE antenna control unit 155 controls the BLE antenna 156 and performs the BLE communication.

By configuring the BLE controller 15 in the present embodiment as described above, the BLE controller 15 can operate independently from the host part 10. In other words, the BLE controller 15 is activated, even if the power supply unit 103 stops power supply to the host part 10, by the power supply from the power supply unit 151 and can perform a BLE communication 590 with an external apparatus.

Figure 2:
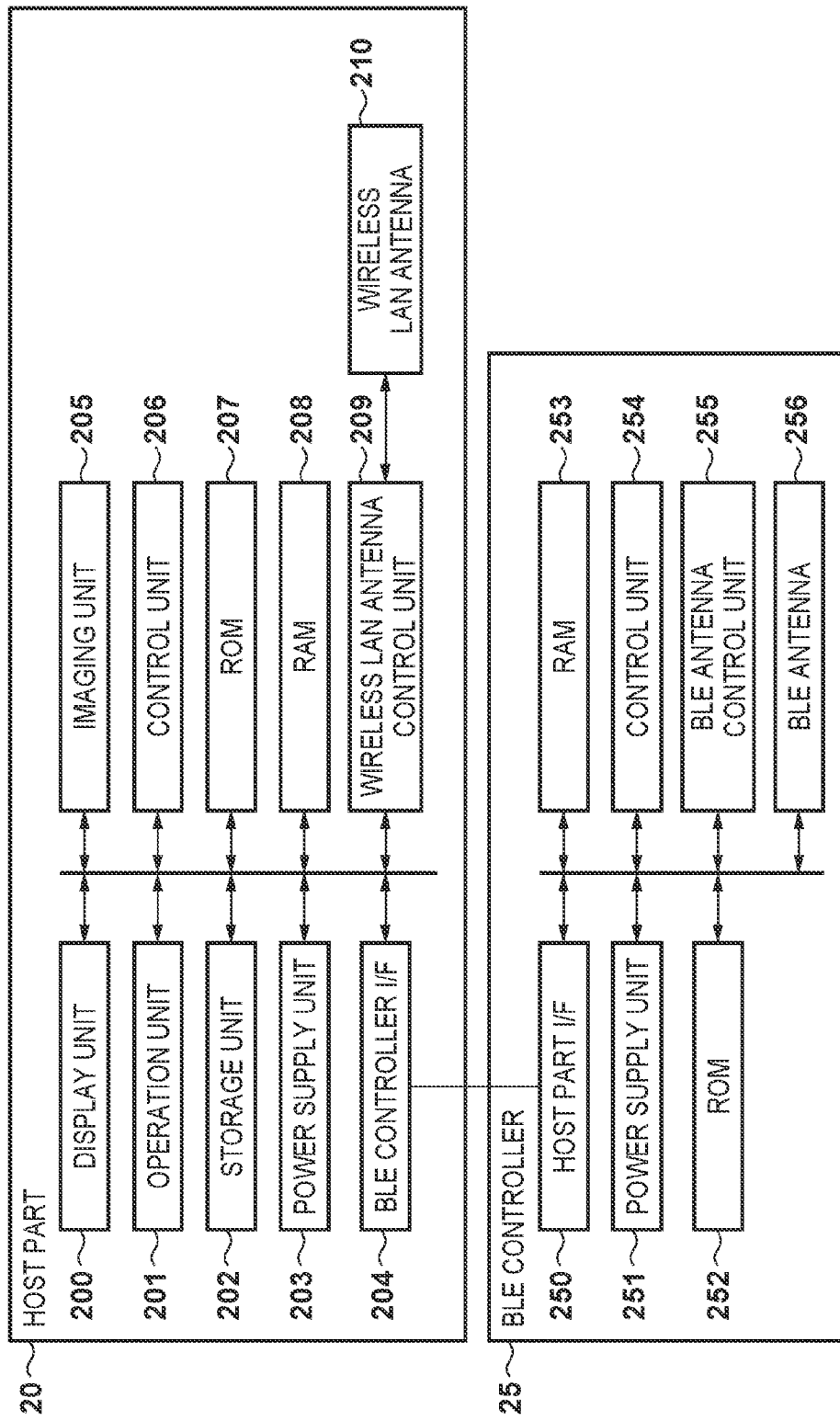
FIG. 2 illustrates an example of a hardware configuration of an imaging apparatus (a digital camera) according to an embodiment.

FIG. 2 is illustrates an example of a hardware configuration of an imaging apparatus (the digital camera 2) in the present embodiment. The imaging apparatus, unlike the communication apparatus used and described in FIG. 1, does not have a mobile network communication antenna control unit, a mobile network communication antenna, a GPS antenna control unit, or a GPS antenna. Because the other configuration is similar to the communication apparatus of FIG. 1, the description is omitted here.

Figure 3:
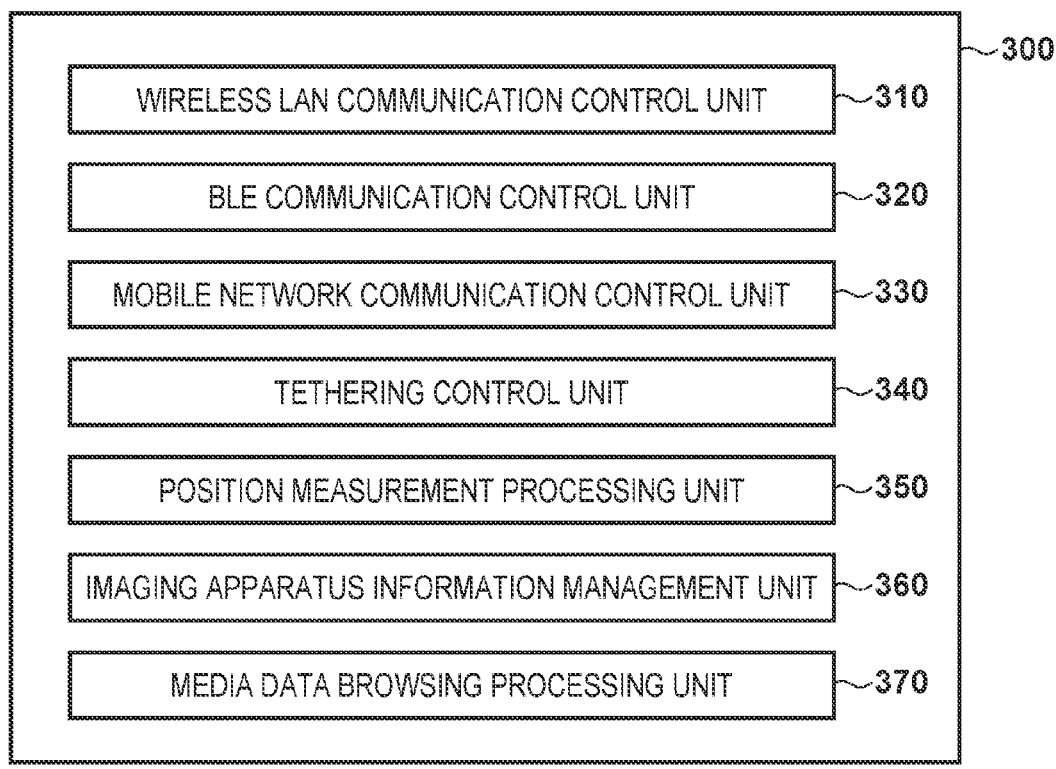
FIG. 3 illustrates a functional block of the communication apparatus (smart phone) according to the embodiment.

Next, functions of the communication apparatus (smart phone 1) in the present embodiment are described with reference to FIG. 3. FIG. 3 illustrates a functional block diagram of the communication apparatus (smart phone 1) in the present embodiment. Note that in the present embodiment, each functional block illustrated below is something for which a function is implemented as a software program, but a part or all of what is included in a basic functional block may be implemented in hardware.

A wireless LAN communication control unit 310 controls the wireless LAN communication via the wireless LAN antenna control unit 109. A BLE communication control unit 320 controls the BLE communication via the BLE antenna control unit 155. A mobile network communication control unit 330 controls the mobile network communication 570 via the mobile network communication antenna control unit 111. A tethering control unit 340 performs relay processing (tethering processing) between the wireless LAN communication 580 via the wireless LAN antenna control unit 109, and the mobile network communication 570 via the mobile network communication antenna control unit 111. When the tethering processing is initiated, the tethering control unit 340 instructs the wireless LAN communication control unit 310 to operate as an access point for the wireless LAN. Also, when the tethering processing is terminated, the tethering control unit 340 instructs the wireless LAN communication control unit 310 to stop the AP function of the wireless LAN.

A position measurement processing unit 350 measures a current position of the smart phone 1. The position measurement processing unit 350 has a function which analyzes the GPS signal 560 obtained via the GPS antenna control unit 113, and calculates a present latitude and longitude information of the smart phone 1. Also, the position measurement processing unit 350 has a function in which the network obtains the present position from an external server device or the like based on network information of the wireless LAN obtained via the wireless LAN communication control unit 310. Also, the position measurement processing unit 350 has a function of storing information for a specific position and a specific UUID in association, and determining the position information corresponding to the UUID when the UUID is obtained via the BLE communication control unit 320. The position measurement processing unit 350 totals the information obtained by these functions, to continuously measure the current position of the smart phone 1.

Note, although not included in the present embodiment, in the implementation of the present embodiment, the position measurement processing unit 350 may measure the current position of the smart phone 1 using a function other than the above. For example, the position measurement processing unit 350 may use a communication device and the like which uses an air pressure gauge, an acceleration sensor, visible light, sound waves or the like to measure the current position. Also, the position measurement processing unit 350 may measure a radio field intensity of a mobile network communication, a BLE communication, or a wireless LAN communication having a specific identifier to measure the current position. Also, the position measurement processing unit 350 may measure the current position combining the measurement methods described above.

An imaging apparatus information management unit 360 registers and manages information of external imaging apparatuses which the smart phone 1 performs communication. The imaging apparatus information management unit 360 has a function of managing identifiers of imaging apparatuses, and determining whether or not an imaging apparatus which has an identifier can communicate via the BLE communication control unit 320. In the present embodiment, the UUID is the identifier of the imaging apparatus which the imaging apparatus information management unit 360 manages. A media data browsing processing unit 370 performs processing for browsing media data stored in a storage unit 202 of the external imaging apparatus via the wireless LAN communication control unit 310.

In the present embodiment, the functions of the wireless LAN communication control unit 310, the BLE communication control unit 320, the mobile network communication control unit 330, the tethering control unit 340, the position measurement processing unit 350, the imaging apparatus information management unit 360, and the media data browsing processing unit 370 are made to be programs. Also, the programs are stored in the ROM 107, and these functions are implemented by executing these programs by the control unit 106.

Figure 4:
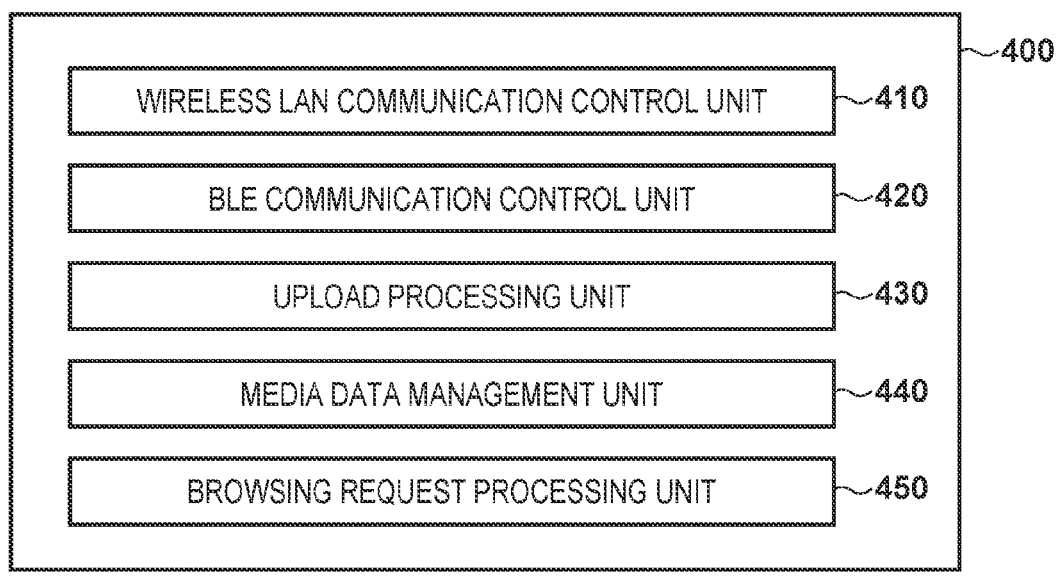
FIG. 4 illustrates a functional block of the imaging apparatus (digital camera) according to the embodiment.

Next, functions of the imaging apparatus (the digital camera 2) in the present embodiment are described with reference to FIG. 4. FIG. 4 illustrates a functional block diagram of the imaging apparatus (the digital camera 2) in the present embodiment. Note that in the present embodiment, each functional block illustrated below is something for which a function is implemented as a software program, but a part or all of what is included in a basic functional block may be implemented in hardware.

A wireless LAN communication control unit 410 controls the wireless LAN communication 580 and 581 via a wireless LAN antenna control unit 209. A BLE communication control unit 420 controls the BLE communication 590 via a BLE antenna control unit 255. Also, the BLE communication control unit 420 controls the power supply to a host part 20 which has a wireless LAN communication function. An upload processing unit 430 transmits the media file, which is target data to be transmitted and which is stored in the storage unit 202, to the external device via a wireless LAN communication control unit 410. A media data management unit 440 manages media files that are imaged by an imaging unit 205 and stored in the storage unit 202. Also, the media data management unit 440 has a function which stores each media file stored in the storage unit 202 based on whether or not they were transmitted to the external device via the upload processing unit 430. A browsing request processing unit 450 processes an image browsing request from the smart phone.

In the present embodiment, functions of the wireless LAN communication control unit 410, the BLE communication control unit 420, the upload processing unit 430, the media data management unit 440, and the browsing request processing unit 450 are made to be programs. Also, the programs are stored in a ROM 207, and these functions are implemented by executing these programs by a control unit 206.

Next, with reference to the operational flows of FIG. 6 to FIG. 10A-FIG. 10B, FIG. 12 to FIG. 14, and FIG. 22, explanation will be given regarding an operational procedure of when the smart phone 1 performs control to upload an image (automatic upload processing) to the server 550 of the digital camera 2 in the present embodiment.

Figure 6:
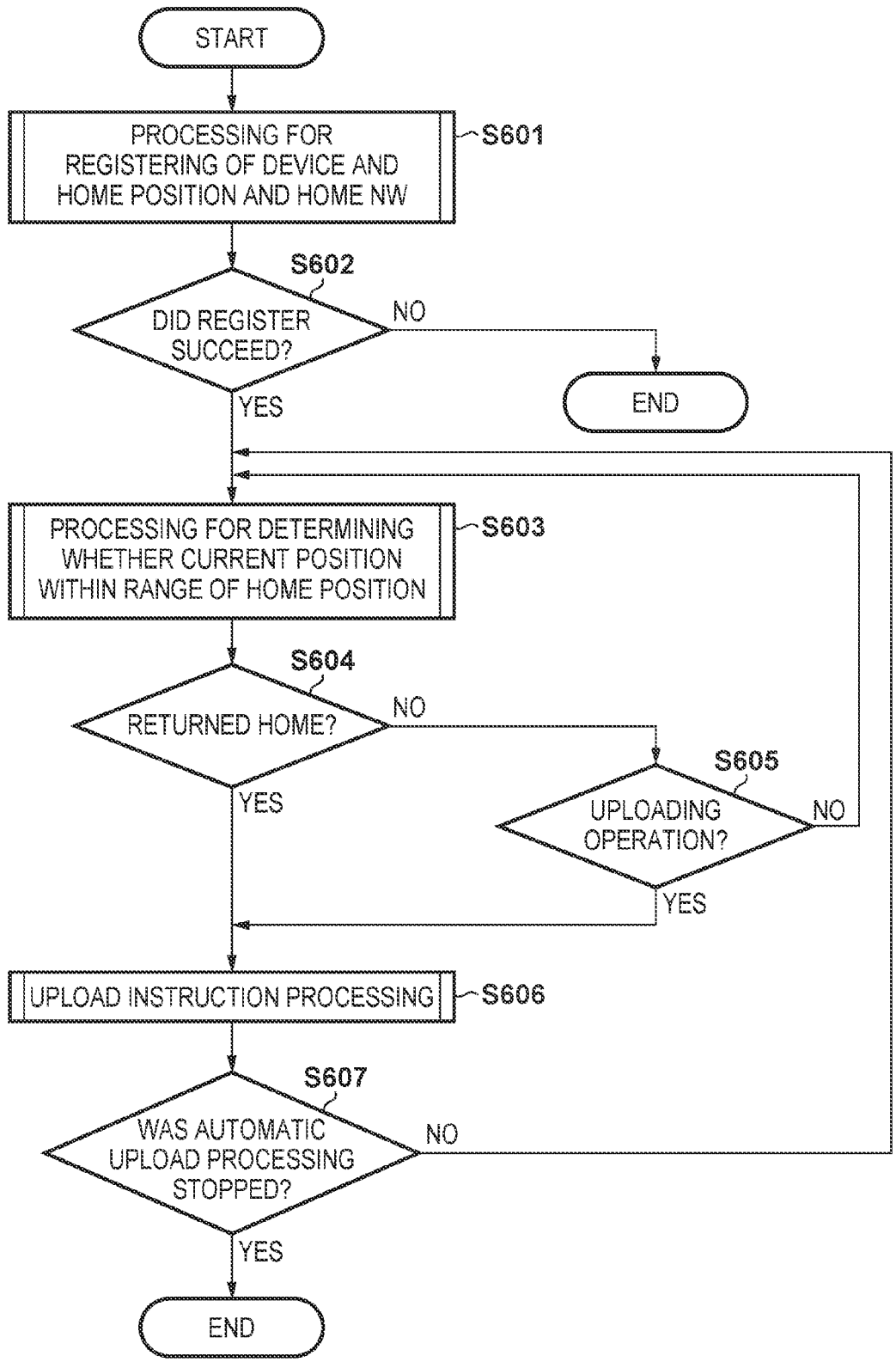
FIG. 6 illustrates an operational flow of the communication apparatus (smart phone) according to the embodiment.

FIG. 6 illustrates an operational flow of processing in which the smart phone 1 performs instruction of an automatic upload to the digital camera 2. First, the smart phone 1 searches for a network and a home position used for a determination of step S603 described later, and registers (step S601) the digital camera 2 as a peripheral device set as a target of the automatic upload. Details of this process will be described later using FIG. 7A-FIG. 7B. If processing for registering of step S601 fails (No in step S602), the smart phone 1 terminates processing of FIG. 6. If processing for registering of step S601 succeeds (Yes in step S602), the smart phone 1 repeats processing of step S603 to step S607 until the automatic upload processing is stopped by a user operation (until it becomes Yes in step S607).

If processing for registering of step S601 succeeds (Yes in step S602), the position measurement processing unit 350 of the smart phone 1 determines whether or not the current position is within range of the home position registered in step S601 (step S603). Details of the determination method will be described later using FIG. 8. In the case where the result of the determination of step S603 is that the position measurement processing unit 350 determined that the smart phone 1 is present within the range of the home position, specifically, the user who holds the smart phone 1 has returned home (Yes in step S604), the smart phone 1 performs an instruction to upload the media file to the digital camera 2 which was registered in step S601 (step S606). Here, in the determination processing of step S603 which is repeatedly executed, in a case when the current position of the smart phone 1 is determined to be outside the home upon the previous execution and determined to be within the home upon the current execution, the position measurement processing unit 350 determines that the user returned home.

Also, details of upload instruction processing of step S606 will be described later using FIG. 9.

If the position measurement processing unit 350 did not determine that the user returned home (No in step S604), the smart phone 1 determines whether or not the user used the operation unit 101 to perform an operation for uploading the media file of the digital camera 2 (step S605). If it is determined that the user is performing the upload operation (Yes in step S605), the smart phone 1 performs the instruction to upload the media file to the digital camera 2 registered in step S601 (step S606). If it is determined that the user is not performing the upload operation (No in step S605), the processing returns to step S603 without the smart phone 1 performing the instruction to upload the media file to the digital camera 2.

When the upload instruction processing of step S606 is complete, the smart phone 1 determines whether or not the user used the operation unit 101 to perform a stopping operation of the automatic upload processing (step S607). If a user is not performing the stopping operation (No in step S607), the smart phone 1 once again repeats the processing of step S603 through step S607. If a user is performing the stopping operation (Yes in step S607), the smart phone 1 terminates the processing of FIG. 6.

Figure 7A:
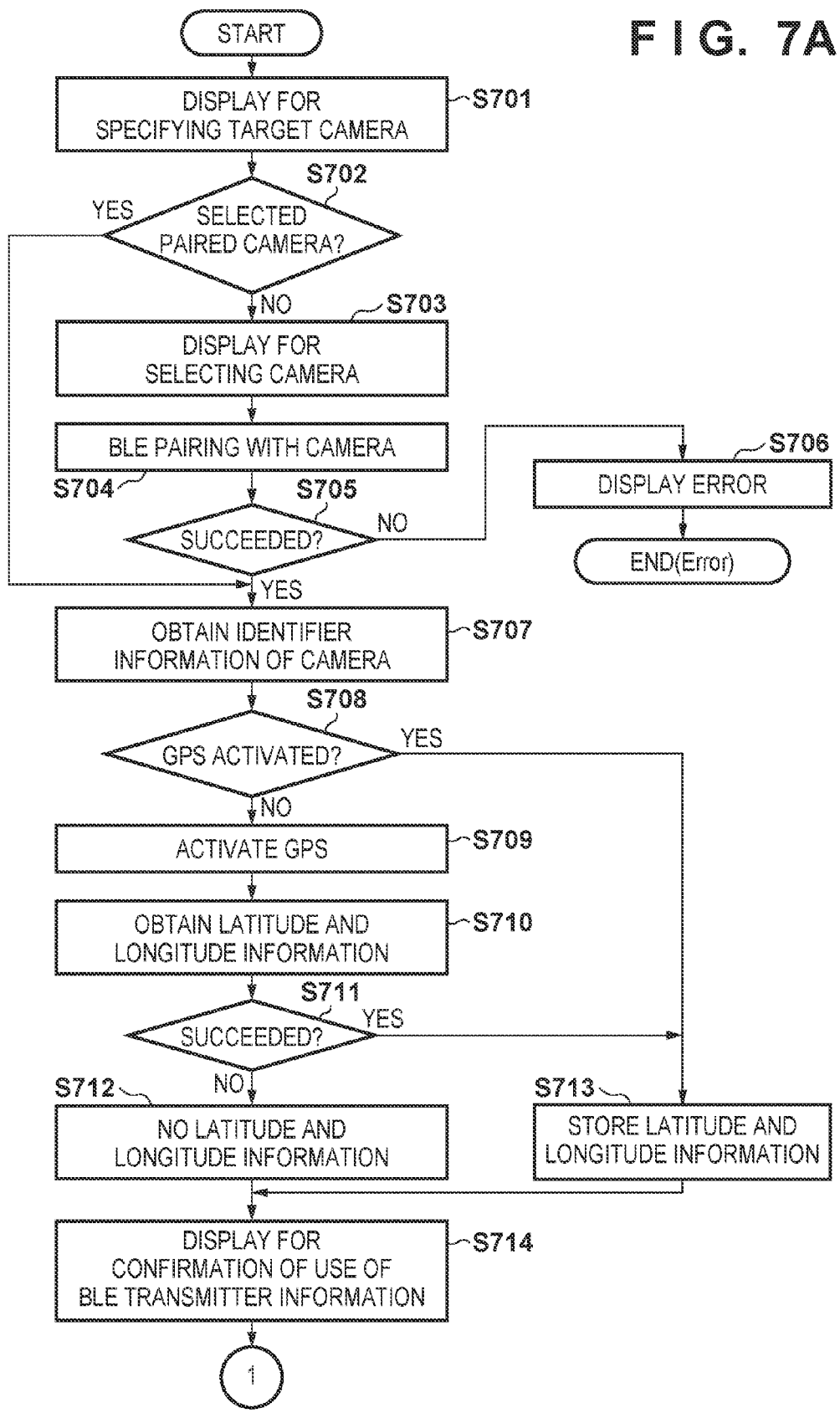
FIG. 7A-FIG. 7B illustrate operational flows of the communication apparatus (smart phone) according to the embodiment.
Figure 7B:
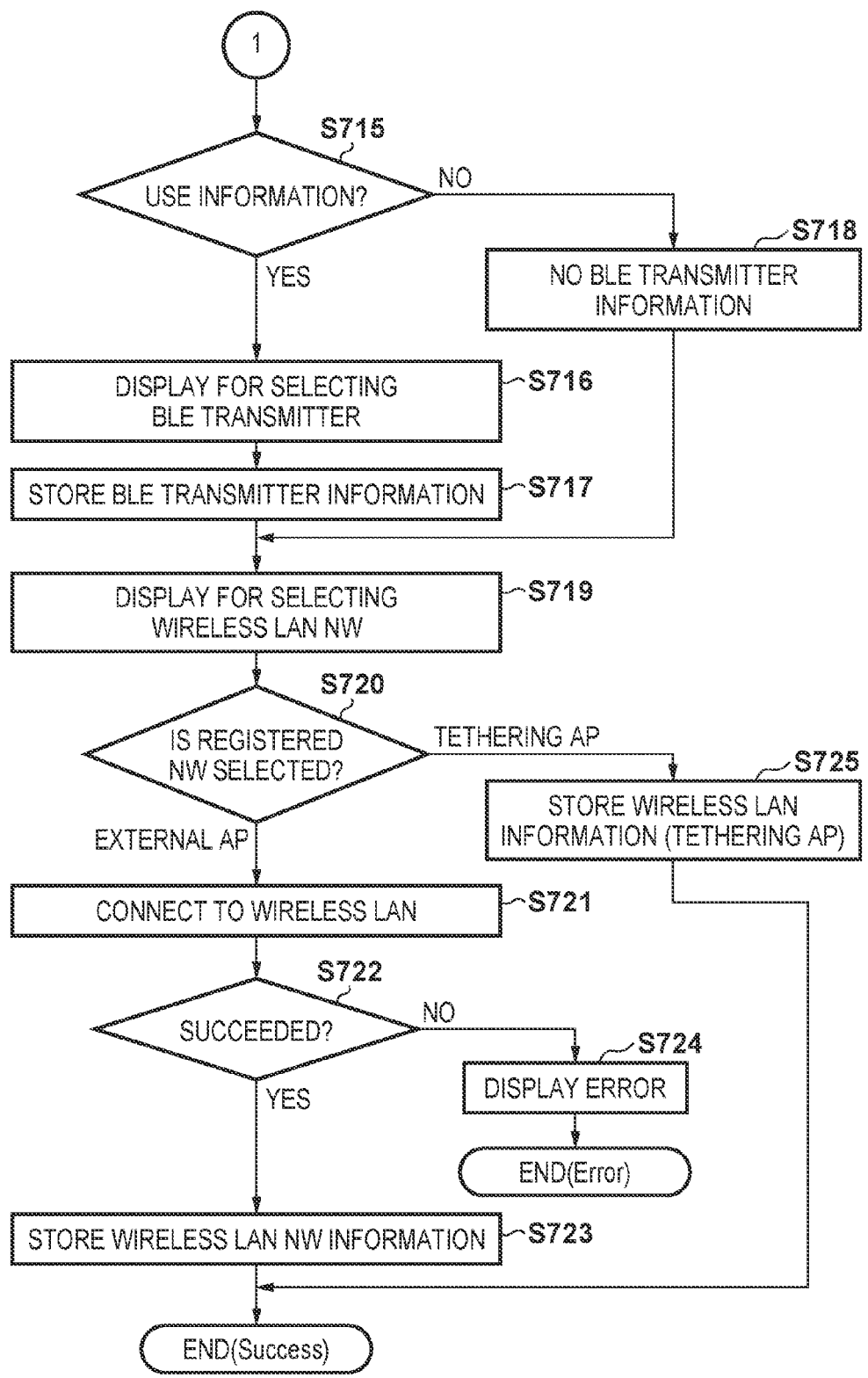

FIG. 7A-FIG. 7B illustrate operational flows of a search and registration process (step S601) by the smart phone 1. First, the smart phone 1 displays to the display unit 100 a screen for specifying a digital camera (step S701) to be a target of the automatic upload processing. On this screen, a screen for a list of digital cameras paired by BLE communication that are managed by the imaging apparatus information management unit 360 and a screen for a digital camera registration menu which expresses a newly registering a digital camera are displayed. The user operates the operation unit 101 to select a digital camera which is displayed on the display unit 100, or the digital camera registration menu.

If the user selects a paired camera, (Yes in step S702), the imaging apparatus information management unit 360 obtains and stores identifier information of the digital camera that the user selected (step S707) via the BLE communication control unit 320. The identifier information of the digital camera in the present embodiment is a UUID, however, other information may be used. For example, a model name and address information of the BLE communication or the wireless LAN communication, a nickname or the like of the device which a user set, or the like may be used.

However, if a user selects the digital camera registration menu (NO in step S702), the BLE communication control unit 320 searches for peripheral devices with which that the smart phone 1 can communicate by BLE, and displays a list of information of discovered peripheral devices on the display unit 100 (step S703). As an example, a list of devices discovered by BLE communication scan processing is displayed on the display unit 100. Also, the BLE communication control unit 320 further obtains names and types of the devices that are discovered, and if peripheral devices for which automatic upload processing is possible are selected, a list of the selected peripheral devices may be displayed on the display unit 100. The user operates the operation unit 101 to select the digital camera which is a device for which the performance of the automatic upload processing is desired from the list of devices displayed on the display unit 100 in step S703.

The imaging apparatus information management unit 360 attempts a BLE pairing process in relation to the digital camera that the user selected via the BLE communication control unit 320 (step S704). If the pairing process succeeds, (Yes in step S705), the imaging apparatus information management unit 360 obtains and stores identifier information of the digital camera that the user selected (step S707) via the BLE communication control unit 320. If the pairing process failed (NO in step S705), the smart phone 1 displays (step S706) an error message on the display unit 100 and terminates processing of FIG. 7A-FIG. 7B as failed search/registration processing.

When digital camera identifier obtainment and storage processing (step S707) completes, the position measurement processing unit 350 attempts to obtain the current latitude and longitude information of the smart phone 1 via the GPS antenna control unit 113 (step S708 through step S713). Note that in the present embodiment, it is assumed that the user who holds the smart phone 1 is in their home at this time, and the current position of the smart phone 1 is treated the same as the home position.

In a case when the position measurement processing unit 350 had already activated the position information obtainment function by the GPS and latitude and longitude information is already obtained (Yes in step S708), the imaging apparatus information management unit 360 stores this latitude and longitude information as the home position (step S713). In a case when the position measurement processing unit 350 has not activated the position information obtainment function by the GPS (NO in step S708), the position measurement processing unit 350 initiates the GPS function (step S709), and attempts obtainment of the latitude and longitude information via the GPS antenna control unit 113 (step S710). If the position measurement processing unit 350 succeeds in the obtainment of the latitude and longitude information (Yes in step S711), the imaging apparatus information management unit 360 stores the obtained latitude and longitude information as home position information (step S713). If the position measurement processing unit 350 fails in the obtainment of the latitude and longitude information (NO in step S711), the imaging apparatus information management unit 360 does not store the home latitude and longitude information (step S712).

Subsequently, the smart phone 1 displays a message for confirming whether or not to use BLE transmitter information on the display unit 100 to the user (step S714) in order to, in the processing of step S603, determine whether or not the smart phone 1 is present at the home. In the present embodiment, the BLE transmitter is assumed to be installed in the user's home. The user operates the operation unit 101 to select whether or not to use the BLE transmitter information. If the user selected to use the BLE transmitter information (Yes in step S715), the BLE communication control unit 320 searches for BLE transmitters with which the smart phone 1 can communicate by BLE, and displays a list of information of the discovered BLE transmitters on the display unit 100 (step S716). If the user operates the operation unit 101 to select the BLE transmitter, the imaging apparatus information management unit 360 stores that BLE transmitter's identifier (UUID) (step S717). If the user selected not to use information of the BLE transmitter (NO in step S715), the imaging apparatus information management unit 360 does not store the BLE transmitter information (step S718).

Subsequently, the smart phone 1 displays on the display unit 100 (step S719) a screen for selecting a wireless LAN network to use when the digital camera stored in step S707 uploads a media file to the server 550. On this screen, a screen for a list of wireless LAN networks searched for and detected by the wireless LAN communication control unit 310, and a screen for a tethering function usage menu which expresses usage of a tethering function of the smart phone 1 are displayed. The user operates the operation unit 101 to select a wireless LAN network or the tethering function usage menu displayed on the display unit 100.

If the user selects the tethering function usage menu ("tethering AP" in step S720), the imaging apparatus information management unit 360 stores usage of the tethering function of the smart phone 1 in automatic upload processing (step S725) and successfully terminates the search and registration process of FIG. 7A-FIG. 7B. If the user selects any of the wireless LAN networks ("external AP" in step S720), the wireless LAN communication control unit 310 attempts to connect to the selected wireless LAN network (step S721). If connection is successful (Yes in step S722), the imaging apparatus information management unit 360 stores the setting information of the wireless LAN network as the wireless LAN network information which is used by the automatic upload processing (step S723). Here, the stored setting information is defined as a Service Set Identifier (SSID), Basic Service Set Identifier (BSSID), an encryption type, an encryption key, an authentication type, and the like.

When the storage processing of the setting information of the wireless LAN network completes, the smart phone 1 successfully terminates the search and registration process of FIG. 7A-FIG. 7B. If the wireless LAN communication control unit 310 fails to connect to the wireless LAN network (No in step S722), the smart phone 1 displays an error message on the display unit 100 (step S724) and terminates the processing of FIG. 7A-FIG. 7B as a failed search and registration process. Also, at this time, the imaging apparatus information management unit 360 discards the digital camera, the latitude and longitude, and the BLE transmitter information stored in the processing of FIG. 7A-FIG. 7B.

FIG. 8 illustrates an operational flow of a process which determines whether or not the smart phone 1 is positioned within the home (Returned home?) (step S603). The imaging apparatus information management unit 360 determines whether or not the BLE transmitter information was stored in step S717 (step S801). If the BLE transmitter information is stored (Yes in step S801), the position measurement processing unit 350 determines whether or not the BLE signal emitted by the BLE transmitter can be received via the BLE communication control unit 320 (step S802). If the BLE signal cannot be received (No in step S802), the position measurement processing unit 350 determines that the position of the smart phone 1 is outside the home and terminates this process. If the BLE signal can be received (Yes in step S802), the imaging apparatus information management unit 360 determines whether or not the home position information was registered in step S713 (step S803).

If the home position information is not stored (No in step S803), the position measurement processing unit 350 determines that the position of the smart phone 1 is outside the home and terminates this process. If the home position information is stored (Yes in step S803), the position measurement processing unit 350 obtains the current position information (the latitude and longitude) of the smart phone 1 via the GPS antenna control unit 113 (step S804). The position measurement processing unit 350 compares the obtained current position value with the home position value stored in step S713. If both values match or are within a fixed range (Yes in step S805), the position measurement processing unit 350 determines that the position of the smart phone 1 is inside the home and terminates this process. If the obtained current position value and the home position value registered in step S713 are not within the fixed range (No in step S805), the position measurement processing unit 350 determines that the position of the smart phone 1 is outside the home and this process terminates.

If the BLE transmitter information is not stored in step S717 (No in step S801), the imaging apparatus information management unit 360 determines whether or not the home position information is stored in step S713 (step S806). If the home position information is not stored (No in step S806), the position measurement processing unit 350 determines that the position of the smart phone 1 is outside the home and terminates this process. If the home position is stored (Yes in step S806), the position measurement processing unit 350 obtains the current position (the latitude and longitude) information of the smart phone 1 via the GPS antenna control unit 113 (step S807). The position measurement processing unit 350 compares the obtained current position value with the home position value registered in step S713 and if both values match or are within the fixed range (Yes in step S808), determines that the smart phone 1 is positioned within the home and this process terminates. If the obtained current position value and the home position value registered in step S713 are not within the fixed range (No in step S808), the position measurement processing unit 350 determines that the position of the smart phone 1 is outside the home and this process terminates.

FIG. 9 illustrates an operational flow of a process (step S606) in which the smart phone 1 notifies a media file upload request to the digital camera 2. The BLE communication control unit 320 searches for the digital camera 2 of the identifier obtained in step S707 using BLE communication (step S901). If the digital camera 2 cannot be discovered (No in step S901), the smart phone 1 displays an error message on the display unit 100 (step S902) and terminates upload communication processing of FIG. 9. If the digital camera 2 is discovered, specifically, if the notification is received by BLE from the digital camera 2 (Yes in step S901), the smart phone 1 determines whether or not the wireless LAN network information of the external AP was stored in step S723 (step S903).

If the wireless LAN network information of the external AP is stored (Yes in step S903), the wireless LAN communication control unit 310 performs a search process for detecting this wireless LAN network (step S904). If this wireless LAN network can be detected (Yes in step S905), the BLE communication control unit 320 notifies to the digital camera 2 by the BLE communication information which requests uploading a media file, and setting information of this wireless LAN network (step S906). Details of this process will be described in detail using FIG. 12.

If the wireless LAN network information of the external AP is not stored (No in step S903), or if the wireless LAN network could not be detected (No in step S905), the mobile network communication control unit 330 determines usability of the mobile network communication (step S907). If the mobile network communication control unit 330 determines that usage of the mobile network communication is impossible (No in step S907), the smart phone 1 displays an error message on the display unit 100 (step S912) and terminates the upload communication processing of FIG. 9.

If the mobile network communication control unit 330 determines that usage of the mobile network communication is possible (Yes in step S907), the smart phone 1 uses the tethering function and displays on the display unit 100 a message for confirming with the user whether the automatic upload processing may be performed (step S908). If the user operates the operation unit 101 and does not permit an upload using the tethering function (No in step S909), the smart phone 1 terminates the upload communication processing of FIG. 9. If the user operates the operation unit 101 and permits the upload which used the tethering function (Yes in step S909), the wireless LAN communication control unit 310 activates the AP function to generate the wireless LAN network (step S910). Also, the tethering control unit 340 initiates the relay processing of the mobile network communication controlled by the mobile network communication control unit 330 and the wireless LAN communication controlled by the wireless LAN communication control unit 310. Subsequently, the BLE communication control unit 320 notifies the setting information of the wireless LAN network generated by the wireless LAN communication control unit 310 and the information which requests media file upload to the digital camera 2 by the BLE communication (step S911). Note that the setting information of the wireless LAN network notified in step S911 and step S906 is defined as an SSID, and BSSID, an encryption type, an encryption key, an authentication type, and the like.

When the smart phone 1 transmits the media file upload request to the digital camera 2, the BLE communication control unit 320 awaits and receives an upload result notification which was transmitted from the digital camera 2 by the BLE communication (step S913). The BLE communication control unit 320 determines whether or not the upload result can be received (step S917). If the upload result cannot be received by the time out duration of the BLE communication defined by the BLE specification (No in step S917), the smart phone 1 displays that there is no upload image on the display unit 100 as the upload result (step S918). If the notification can be received (Yes in step S917), the smart phone 1 displays success/failure of the automatic upload processing to the display unit 100 which is indicated by the notification (step S914). After this, if the wireless LAN communication control unit 310 activated the tethering AP function in step S915 (Yes in step S915), the wireless LAN communication control unit 310 stops the tethering AP function.

In the present embodiment, the BLE communication control unit 320 has a client function of a Generic Attribute Profile (GATT) layer established by the BLE specification. Also, the BLE communication control unit 420 includes a server function of the GATT layer of BLE. In the present embodiment, the BLE communication control unit 420 provides the two services: a Station service and an AP service. The smart phone 1 uses the Station service for a request, as a first request, to transfer an image for which transfer is necessary. In other words, the smart phone 1 transmits to the digital camera 2 a first request signal for the first request which requests that the digital camera 2 operate as a Station (the terminal apparatus). Also, the smart phone 1 uses the AP service for an image browsing processing request which is a second request. In other words, the smart phone 1 transmits to the digital camera 2 a second request signal for the second request which requests that the digital camera 2 operate as an AP. The service is defined as a plurality of data areas linked to a service. Each data area is capable of reading and writing from the client. Also, it is possible to notify a value of a data area to the client.

In the present embodiment, Characteristics which are defined by the BLE specification as the data areas are used. A request to write to the data areas from the client is transmitted using a Write Request defined by the BLE specification. A request to read data of the data areas from the client is transmitted using a Read Request defined by the BLE specification. If data of the data areas is notified to the client, a Notification defined by the BLE specification is used.

FIG. 21A is a data format (Characteristics) of the data areas of the Station service in the present embodiment. An area for writing is an area that can be written from the smart phone 1. The smart phone 1, if a request to transfer to the digital camera 2 is made, writes an SSID to this area. In the present embodiment, though the smart phone 1 writes the SSID to the area for writing, limitation is not made to this, and configuration may also be taken such that it writes a BSSID, an encryption type, an encryption key, an authentication type, or the like. Also, configuration may also be taken such that the smart phone 1 writes a transfer request, and a parameter for connecting to a network such as an SSID to another area. An area for an error processing flag is used if the digital camera 2 fails in connecting to the wireless LAN network, or if uploading fails.

FIG. 21B is a data format (Characteristics) of the data areas of the AP service in the present embodiment. The area for writing is used in a case in which the smart phone 1 makes an image browsing request to the digital camera 2. An area for a status notification is used for notify to the smart phone 1 that the wireless LAN communication control unit 410 activates the AP function to generate the wireless LAN network. In the areas of an encryption method, a passphrase, and an SSID, parameters necessary for connecting to an AP activated by the wireless LAN communication control unit 410 are written. The smart phone 1 reads the values and connects to the digital camera 2 which is the AP.

Note, in the present embodiment, though the Station service and the AP service are defined as services which are provided by the BLE communication control unit 420, limitation is not made to this. For example, a function for performing an upload request and a function for performing image browsing processing may also be defined as a service.

Figure 10A:
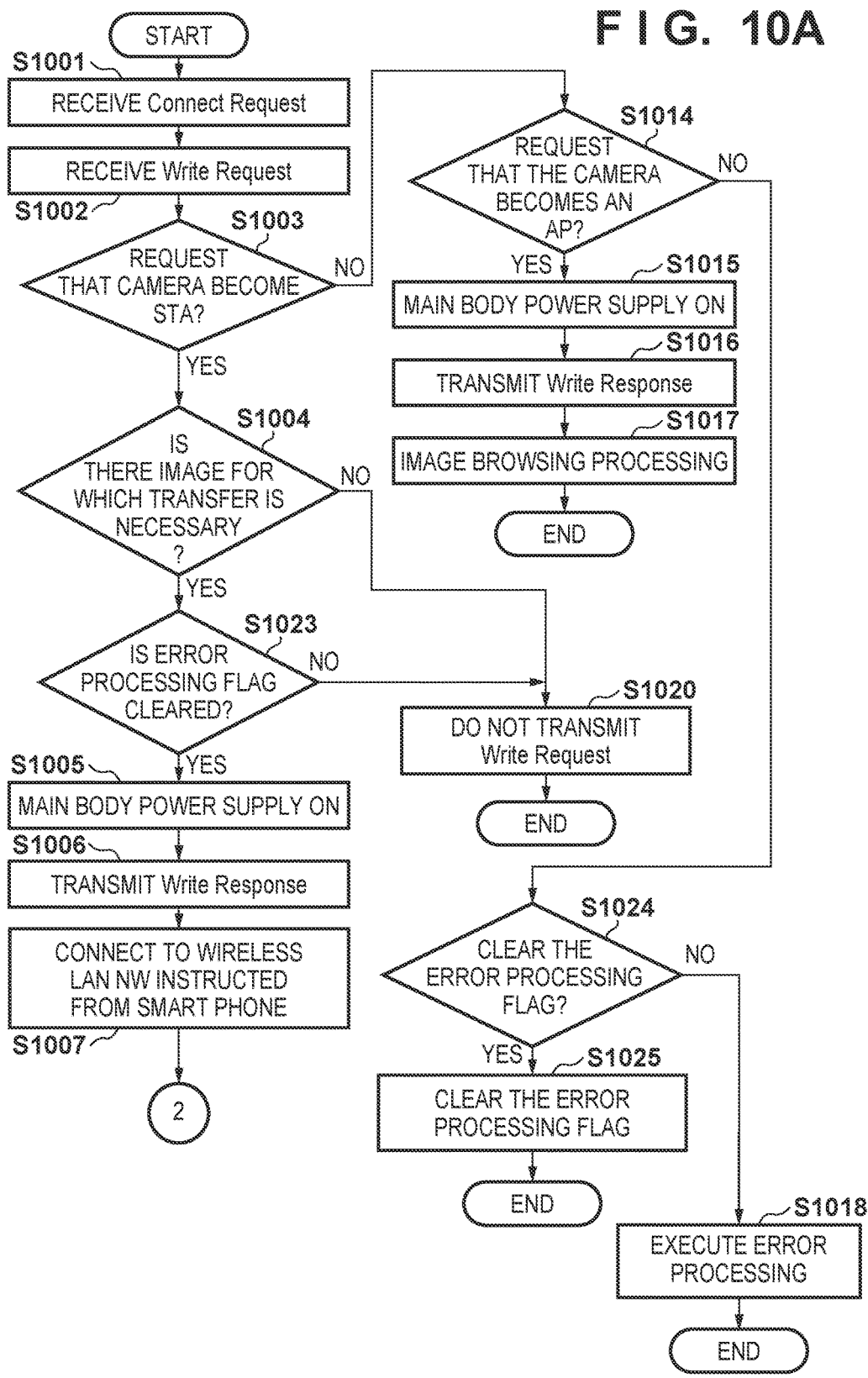
FIG. 10A-FIG. 10B illustrate operational flows of the imaging apparatus (digital camera) according to the embodiment.
Figure 10B:
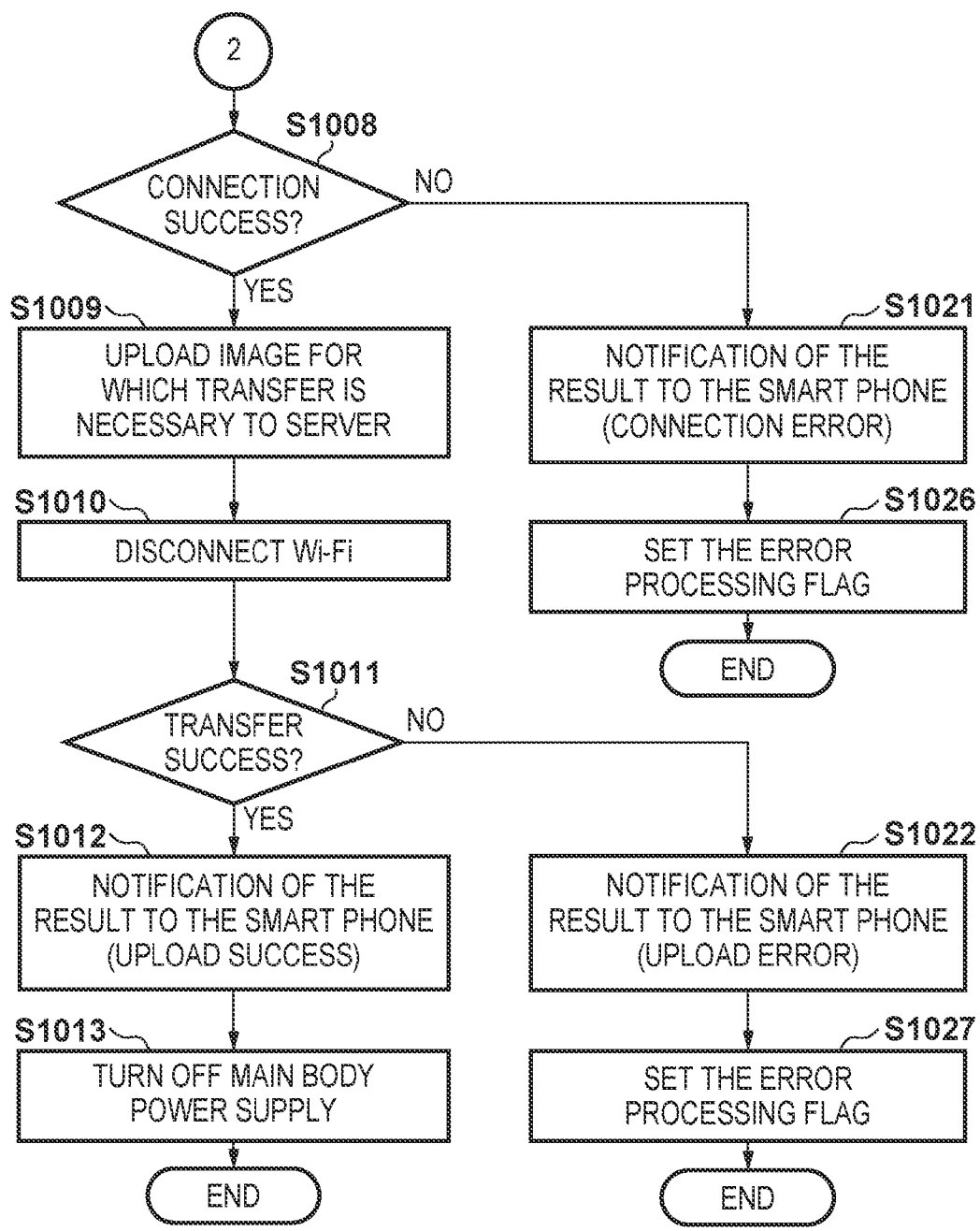

Next, an explanation will be given regarding an operational procedure of the digital camera 2. FIG. 10A-FIG. 10B illustrate operational flows of a process when the digital camera 2 receives the upload request. The BLE communication control unit 420 receives a Connect Request, defined by the BLE specification, from the smart phone 1 via the BLE antenna control unit 255 (step S1001). Next, the BLE communication control unit 420 receives a Write Request that the smart phone 1 transmitted via the BLE antenna control unit 255 (step S1002). The BLE communication control unit 420 discriminates whether the received Write Request is a signal requesting that the camera become the Station (step S1003). More specifically, the BLE communication control unit 420 performs this discrimination based on whether or not the target of the request to write of the Write Request is the area for writing of the Station service.

If it is a request that the camera become the Station (Yes in step S1003), the BLE communication control unit 420 determines whether there is a media file for which transferring is necessary (step S1004). In the present embodiment, the media data management unit 440 writes to the RAM 253 a flag of whether or not there is a media file for which transfer is necessary and performs determination based on this flag. The BLE communication control unit 420 confirms the flag of whether or not there is a media file in the RAM 253 and if there is no media file for which transfer is necessary (No in step S1004), does not perform transmission of the Write Response (step S1020). Also at this time, the BLE communication control unit 420 does not perform a supply of power to the host part 20 which has the wireless LAN communication function. The BLE communication control unit 420, if there is a media file for which transfer is necessary (Yes in step S1004), confirms whether or not an error processing flag is cleared (in other words, whether or not the area for the error processing flag of FIG. 21A is "W") (step S1023). The BLE communication control unit 420, if the error processing flag is not cleared, does not transmit the Write Response (step S1020).

The BLE communication control unit 420, if there is a media file for which transfer is necessary and the error processing flag is cleared (Yes step S1023), puts the power supply of a power supply unit 203 of the host part 20 in an ON state via a host part I/F 250 (step S1005). The BLE communication control unit 420 transmits a Write Response to the smart phone 1 via the BLE antenna control unit 255 (step S1006). The wireless LAN communication control unit 410 attempts to connect to the wireless LAN network notified from the smart phone 1 (step S1007). The wireless LAN communication control unit 410 determines whether connecting to the wireless LAN network succeeded (step S1008). If connecting to the wireless LAN network succeeds (Yes in step S1008), the upload processing unit 430 directly transmits the untransmitted media file to the server 550 via the wireless LAN communication control unit 410 (step S1009).

If connecting to the wireless LAN network fails (No in step S1008), the BLE communication control unit 420 transmits to the smart phone 1 by the BLE communication an upload result notification which indicates that the automatic upload processing failed (step S1021). The BLE communication control unit 420, if a connection error occurs, sets a value which indicates that an error has occurred to the area for the error processing flag (FIG. 21A) of the Station service (step S1026).

If the upload processing unit 430 could transmit successfully every untransmitted media file to the server 550 (Yes in step S1011), the BLE communication control unit 420 transmits an upload result notification which indicates that the automatic upload processing succeeded to the smart phone 1 by the BLE communication (step S1012). Finally, the BLE communication control unit 420 sets the power supply of the power supply unit 203 of the host part 20 to an OFF state via the host part I/F 250 (step S1013). Specifically, the BLE communication control unit 420 stops the power supply to the host part 20 which has the wireless LAN communication control unit 410. If the transmission to the media file fails (No in step S1011), the BLE communication control unit 420 transmits to the smart phone 1 by the BLE communication an upload result notification which indicates that the automatic upload processing failed (step S1022). The BLE communication control unit 420, if an upload error occurs, sets a value which indicates that an error has occurred to the area for the error processing flag of the Station service (step S1026).

If it is not a request that the camera become the Station (No in step S1003), the BLE communication control unit 420 discriminates whether the Write Request is a request that the camera become an AP (step S1014). More specifically, the BLE communication control unit 420 performs this discrimination based on whether or not the target of the request to write of the Write Request is the area for writing of the AP service. If the Write Request is a request that the camera become an AP (Yes in step S1014), the BLE communication control unit 420 set the power supply of the power supply unit 203 of the host part 20 to an ON state via the host part I/F 250 (step S1015). The BLE communication control unit 420 transmits the Write Response via the BLE communication control unit 420 (step S1016). The browsing request processing unit 450 initiates an image browsing process (step S1017). Details of the image browsing process will be explained later in FIG. 14.

If the Write Request is not a request that the camera become an AP (No in step S1014), the BLE communication control unit 420 determines whether or not the Write Request is a request to clear the value of the area for the error processing flag of the Station service (step S1024). If the Write Request was a request to write to the area for the error processing flag (Yes step S1024), the BLE communication control unit 420 clears the error processing flag (step S1025). If the Write Request does not indicate clearing of the error processing flag (Yes step S1024), the BLE communication control unit 420 terminates the processing as an error (step S1018). Note that in the present embodiment although processing terminates as an error in step S1018, if another service is defined, processing of another service may be performed. In such a case, the digital camera 2 receives a third request from the smart phone 1 and implements a service which corresponds to the third request by a service processing unit (not shown).

Note that while in the present embodiment, an untransferred image is transmitted to the server 550 if the Station service in the digital camera 2 is activated, limitation is not made to this, and other functions can also be provided. In such a case, a method which prepares a flag for specifying a function in the data area of the Station service can be considered. Also, in the present embodiment, image browsing processing is performed with respect to a user if the AP service in the digital camera 2 is activated, limitation is not made to this, and other functions can also be provided. In such a case, a method which prepares a flag for specifying a function in the data area of the AP service is considered.

Figure 12:
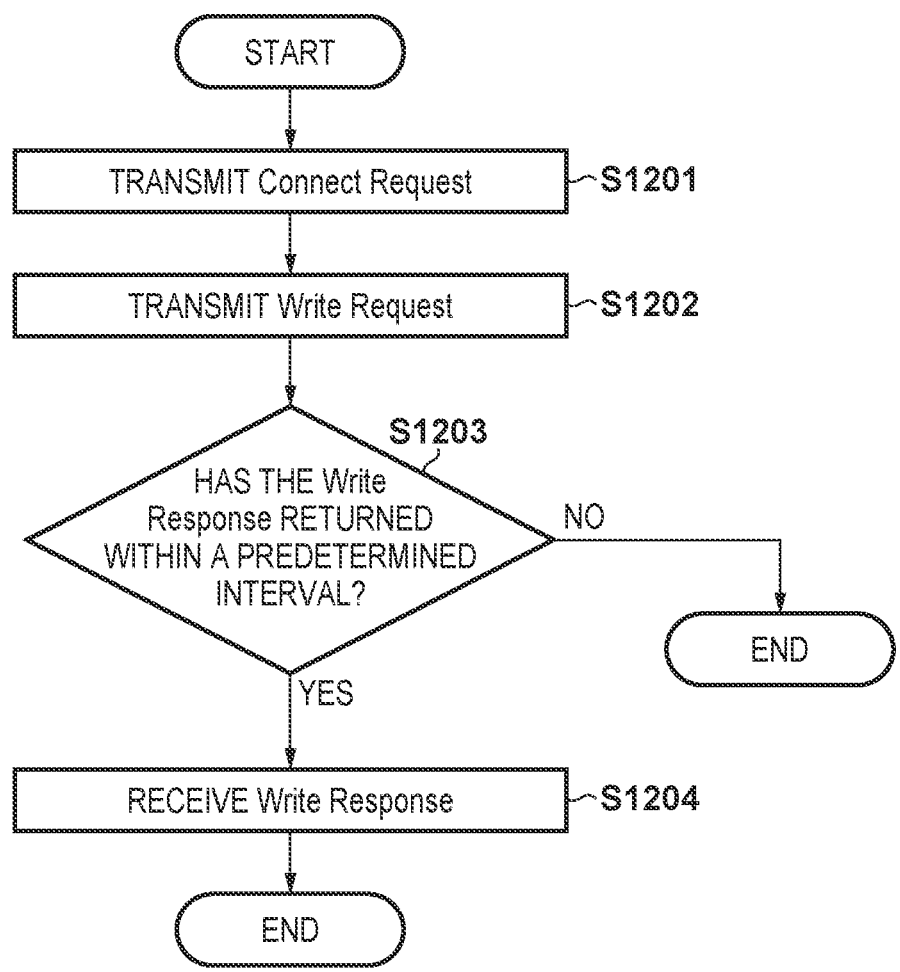
FIG. 12 illustrates an operational flow of the communication apparatus (smart phone) according to the embodiment.

Next, with reference to FIG. 12, explanation is given regarding processing of step S906 of FIG. 9 according to the smart phone 1. FIG. 12 is an operational flow of a detailed process of step S906 of FIG. 9. The BLE communication control unit 320 transmits the Connect Request via the BLE antenna control unit 155 (step S1201). Next, the BLE communication control unit 320 transmits the Write Request via the BLE antenna control unit 155 (step S1202). Here, a request which writes the SSID of the AP of the wireless LAN is transmitted to the area for writing of the Station service (FIG. 21A). The BLE communication control unit 320 determines whether the Write Response returned within a predetermined interval (step S1203). The predetermined interval is defined as a connection time out duration which is defined by the BLE specification. If the Write Response returns within the predetermined interval (Yes in step S1203), the smart phone 1 receives the Write Response (step S1204) and terminates this process as successful. If the Write Response does not return within the predetermined interval (No in step S1203), the smart phone 1 terminates this process as failed.

Figure 22:
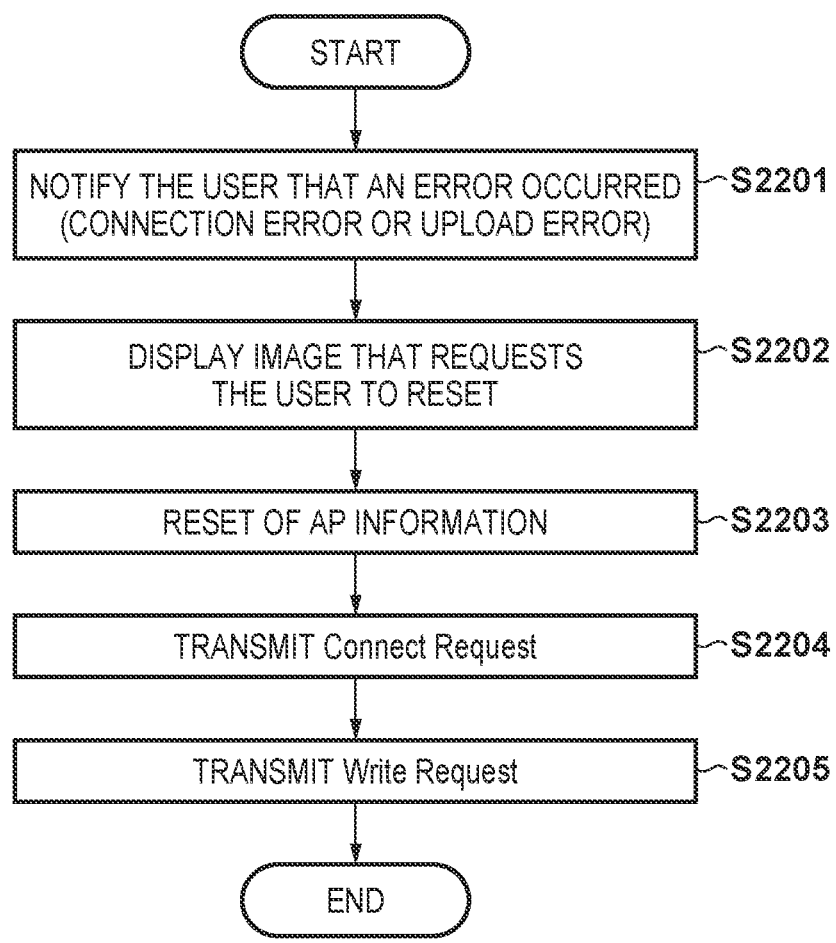
FIG. 22 illustrates an operational flow of the communication apparatus (smart phone) according to the embodiment.

Next, with reference to FIG. 22, explanation is given regarding processing as an example of step S914 of FIG. 9 according to the smart phone 1. FIG. 22 illustrates an operational flow of processing of the smart phone 1 in a case in which in step S914 of FIG. 9 the upload result received from the camera is a connection error or an upload error. The smart phone 1 displays that the connection error or the upload error occurred on the display unit 100 to notify the user that an error occurred (step S2201). Next, the smart phone 1 displays a message on the display unit 100 and requests to the user to reset AP information (step S2202). The user operates the operation unit 101 to perform resetting of the AP information on the smart phone 1 (step S2203). If the AP information reset by the user terminates, the BLE communication control unit 320 transmits a Connect Request via the BLE antenna control unit 155 (step S2204). Next, the BLE communication control unit 320 transmits the Write Request via the BLE antenna control unit 155 (step S2205). Here, the request which clears the error processing flag of the Station service is transmit.

Note, in step S2201 and in step S2202, a method by which the smart phone 1 notifies an error or request to the user is not limited to a message display of the display unit 100. For example, a voice, a vibration, and the like may be used as the notification.

Figure 13:
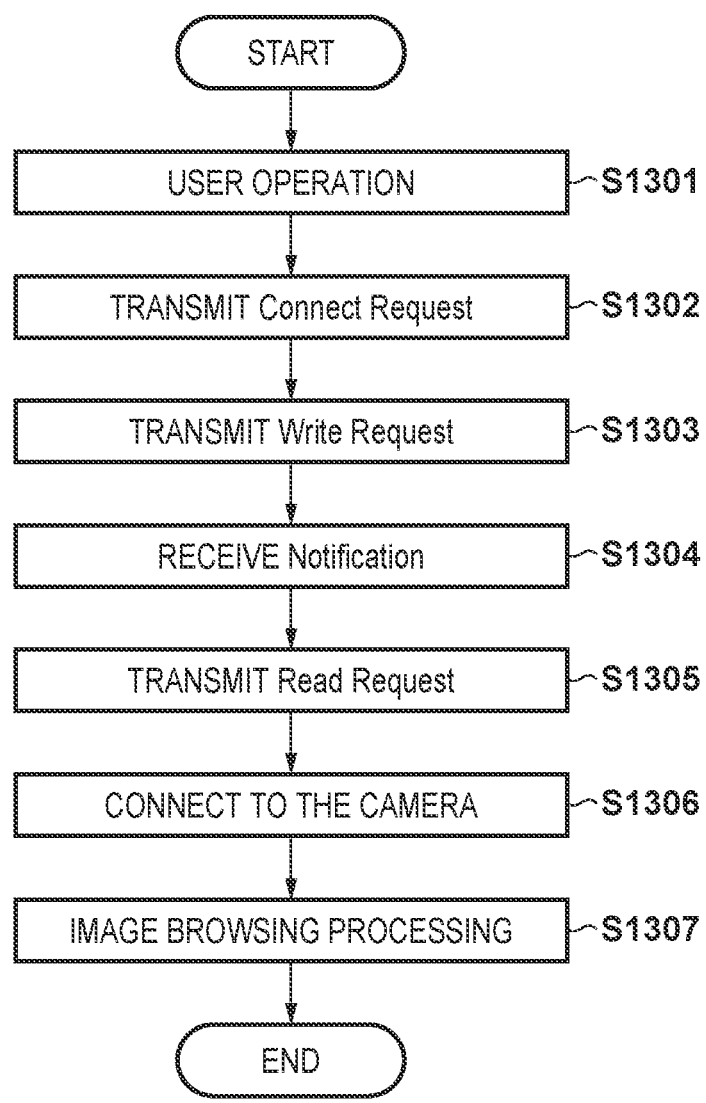
FIG. 13 illustrates an operational flow of the communication apparatus (smart phone) according to the embodiment.

FIG. 13 illustrates an operational flow of processing for an image browsing request to the digital camera 2 by the smart phone 1. Note, the image browsing processing is defined as, for example, processing in which the digital camera 2 transmits a media file to the smart phone 1, and the smart phone 1 temporarily, and without saving, browses the media file.

The smart phone 1 initiates the image browsing processing triggered by a user operation (step S1301). The BLE communication control unit 320 transmits the Connect Request via the BLE antenna control unit 155 (step S1302). Next, the BLE communication control unit 320 transmits the Write Request via the BLE antenna control unit 155 (step S1303). Here, the write request is transmitted to the area for writing (FIG. 21B) of the AP service. The BLE communication control unit 320 receives a Notification via the BLE antenna control unit 155 (step S1304). The BLE communication control unit 320 confirms contents of the Notification and confirms that the AP of the camera is activated. If the activation of the AP of the camera is confirmed, the BLE communication control unit 320 transmits a Read Request via the BLE antenna control unit 155 (step S1305). Here, parameters of an SSID, a passphrase, an encryption method, and the like for connecting to the AP of the digital camera are obtained. The wireless LAN communication control unit 310 uses the obtained parameters to connect to the digital camera (step S1306). If the smart phone 1 successfully connects to the digital camera 2, the image browsing processing is performed (step S1307).

Figure 14:
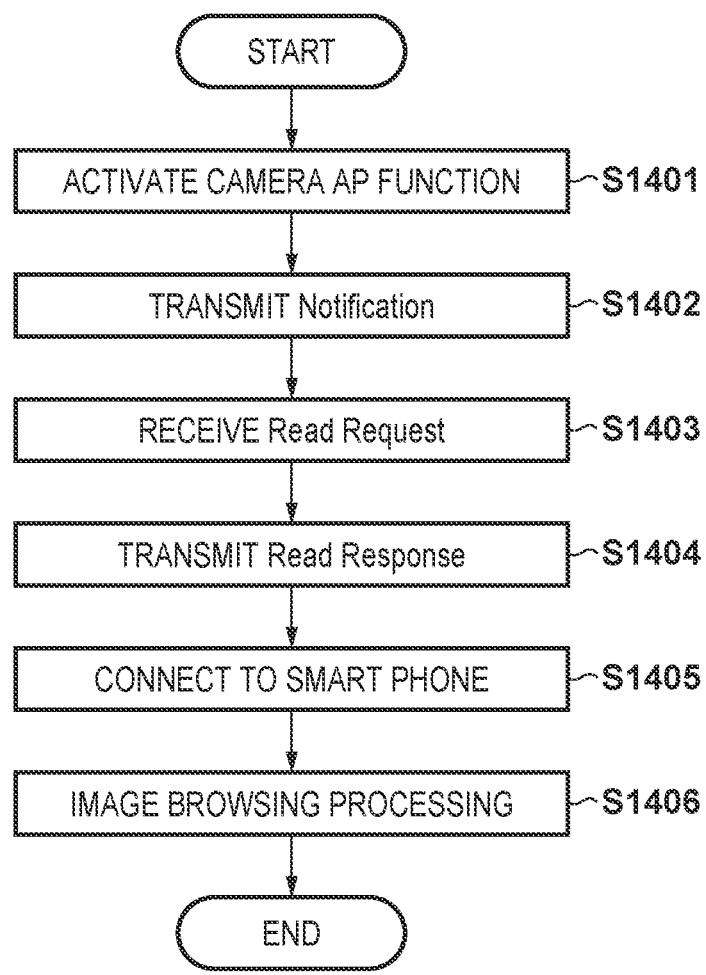
FIG. 14 illustrates an operational flow of the imaging apparatus (digital camera) according to the embodiment.

FIG. 14 illustrates an operational flow of processing of the image browsing request from the smart phone 1 by the digital camera 2. The wireless LAN communication control unit 410 activates the AP function to generate the wireless LAN network (step S1401). Next, the BLE communication control unit 420 transmits the Notification via the BLE antenna control unit 255 (step S1402). The BLE communication control unit 420 receives a Read Request via the BLE antenna control unit 255 (step S1403). The BLE communication control unit 420 transmits a Read Response via the BLE antenna control unit 255 (step S1404). An SSID, a passphrase, an encryption method, and the like are included in the Read Response for connecting to the AP of the digital camera. The wireless LAN communication control unit accepts the connection from the smart phone 1 (step S1405). If the digital camera 2 successfully connects to the smart phone, the image browsing processing is performed (step S1406).

Next, detailed explanation is given with reference to FIG. 11 and FIG. 15 through FIG. 19 regarding an example of a communication sequence between each device in the device configuration illustrated in FIG. 5.

FIG. 11 illustrates an exemplified communication sequence which relates to the search and registration process when a user operates the operation unit 101 of the smart phone 1 to initiate the automatic upload processing of the digital camera 2. Specifically, this process corresponds to the process of FIG. 7A-FIG. 7B in the smart phone 1.

When the user operates the operation unit 101 of the smart phone 1, and performs an operation to initiate the automatic upload processing of the digital camera 2 (step S1101), the BLE communication control unit 320 of the smart phone 1 performs the BLE pairing process with the digital camera 2 (step S1102). Subsequently, the BLE communication control unit 320 of the smart phone 1 uses BLE communication to obtain the identifier (UUID) of the digital camera 2 (step S1103). Next, the position measurement processing unit 350 of the smart phone 1 activates the GPS function (step S1104) and receives the GPS signal which is transmitted by the GPS satellite 510 (step S1105). The position measurement processing unit 350 of the smart phone 1 calculates the latitude and longitude from the received GPS signal and the imaging apparatus information management unit 360 stores this as home position information (step S1106).

Next, the BLE communication control unit 320 of the smart phone 1 receives a BLE Advertising packet which is transmitted by the BLE transmitter 540 (step S1107). The imaging apparatus information management unit 360 of the smart phone 1 stores the UUID included in the same message as BLE transmitter identification information (step S1108). Next, the wireless LAN communication control unit 310 of the smart phone 1 executes connection processing of the wireless LAN with the access point 530 (step S1109), and the imaging apparatus information management unit 360 stores the wireless LAN network setting information generated by the access point 530 (step S1110).

Figure 15:
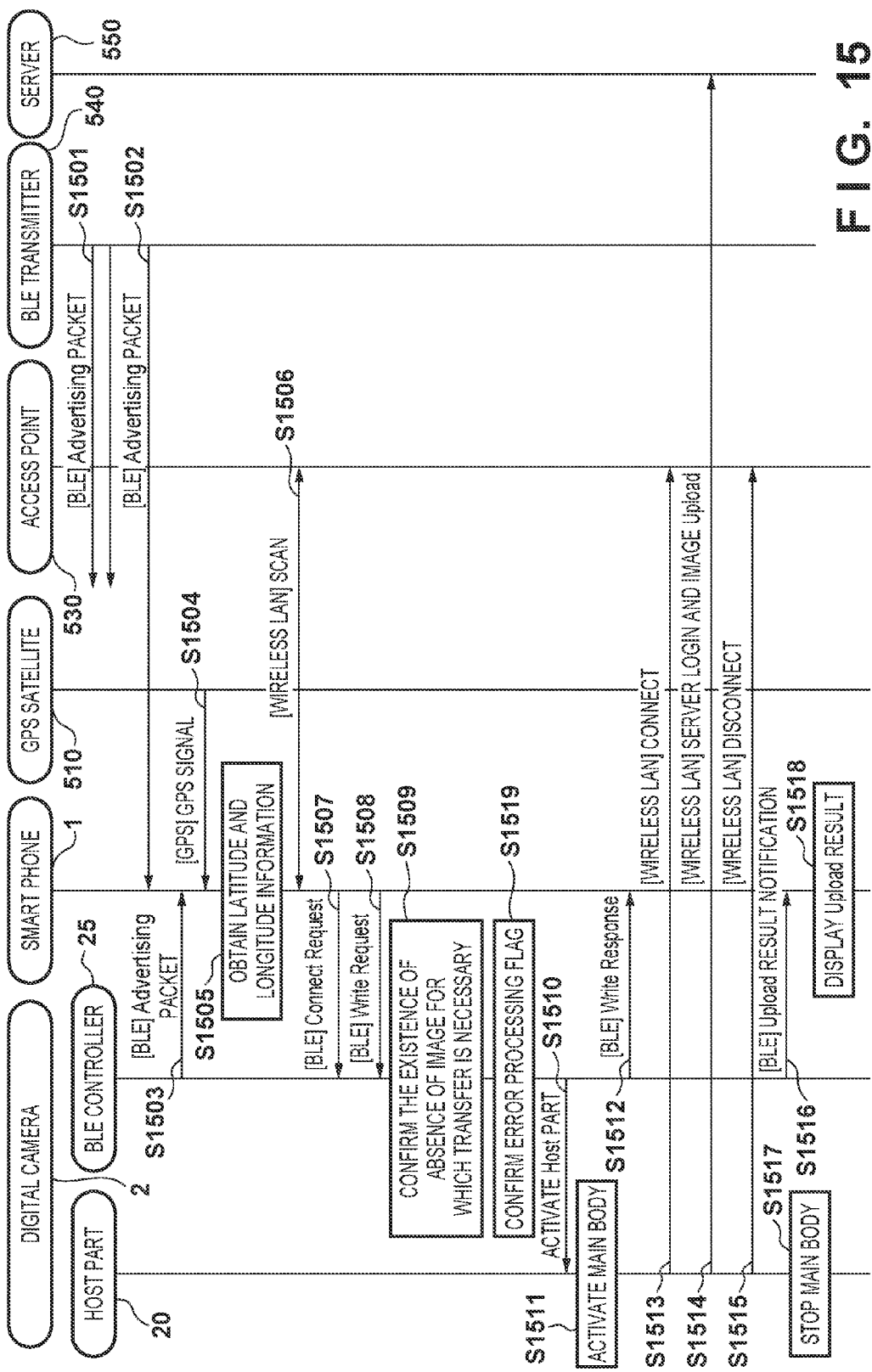
FIG. 15 illustrates an exemplified communication sequence between each device according to the embodiment.

FIG. 15 illustrates an exemplified communication sequence of a case when the error processing flag is cleared when there is an image for which transferring is necessary when the user holds the smart phone 1 and the digital camera 2 and returns home. Specifically, the processing of FIG. 8 and FIG. 9 in the smart phone 1 correspond to this, and the processing of FIG. 10A-FIG. 10B in the digital camera 2 corresponds to this.

The BLE transmitter 540 is installed in the home of the user and periodically transmits a BLE Advertising packet which includes its own UUID (step S1501). If the user returns home the BLE communication control unit 320 of the smart phone 1 receives the Advertising packet of the BLE transmitter 540 because the smart phone 1 enters within the BLE communication range of the BLE transmitter 540 (step S1502). The BLE communication control unit 420 of the digital camera 2 receives the BLE Advertising packet regardless of the power supply of the host part 20 being in an ON or OFF state. The BLE communication control unit 320 of the smart phone 1 initiates a search for a BLE Advertising packet which was transmitted by the digital camera 2 triggered by the reception of step S1502, and this is detected in step S1503.

Next, the position measurement processing unit 350 of the smart phone 1 receives the GPS signal transmitted by the GPS satellite 510 (step S1504), and calculates the latitude and longitude as information of the current position of the smart phone 1 from the received GPS signal (step S1505). Here, the smart phone 1 determines if a self-apparatus is within the home (the user returned home) based on information of the stored home position and information of the calculated current position. Subsequently, if the wireless LAN communication control unit 310 of the smart phone 1 searches and detects the network of the access point 530 (step S1506), the BLE communication control unit 320 transmits a Connect Request (step S1507). Subsequently, the BLE communication control unit 320 transmits the Write Request (step S1508). Here in the Write Request, an upload request and wireless LAN network setting information which the access point 530 manages are included.

When the BLE communication control unit 420 of the digital camera 2 receives the Write Request of step S1508, the BLE communication control unit 420 determines the existence or absence of an image for which transfer is necessary (step S1509). Next, the BLE communication control unit 420 confirms whether the error processing flag is cleared (step S1519). The BLE communication control unit 420 sets the power supply of the power supply unit 203 of the host part 20 to an ON state via the host part I/F 250 (step S1510). With this the power supply of the host part 20 activates (step S1511). The BLE communication control unit 420 transmits a Write Response (step S1512). Subsequently, the wireless LAN communication control unit 410 of the digital camera 2 connects to the wireless LAN network of the access point 530 based on the settings received in step S1508 (step S1513). Next, the upload processing unit 430 of the digital camera 2 performs processing to login to the server 550 via the wireless LAN network connected in step S1513 and processing to upload of the media file (step S1514).

When the upload processing completes, the wireless LAN communication control unit 410 of the digital camera 2 disconnects the connection with the wireless LAN network of the access point 530 (step S1515). Subsequently, the BLE communication control unit 420 of the digital camera 2 transmits the upload processing result to the smart phone 1 by the BLE communication (step S1516) and stops the power supply of the host part 10 (step S1517). When the BLE communication control unit 320 of the smart phone 1 receives the upload processing result (step S1516) from the digital camera 2, the smart phone 1 displays this result on the display unit 100 (step S1518).

Figure 16:
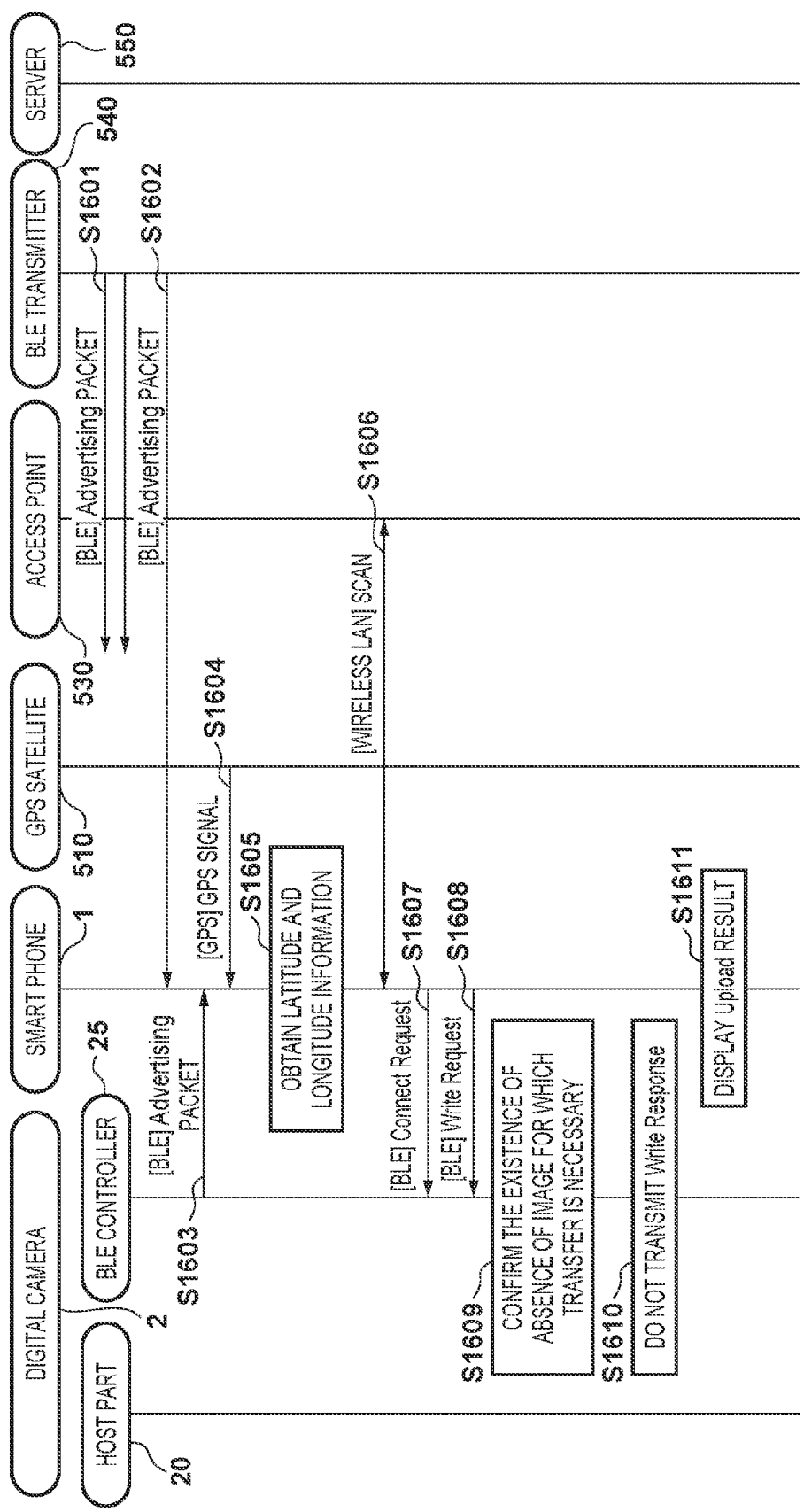
FIG. 16 illustrates an exemplified communication sequence between each device according to the embodiment.

FIG. 16 illustrates an exemplified communication sequence of a case when there is no image for which transferring is necessary when the user holds the smart phone 1 and the digital camera 2 and returns home. Since step S1501 to step S1509 are the same as step S1601 to step S1609, explanation will be omitted here. In FIG. 16, if it is determined that there is no image for which transfer is necessary in step S1609, the BLE communication control unit 420 does not transmit the Write Response (step S1610). The smart phone 1 detects a Write Response wait timeout, and displays that the result of the upload processing request is that there was no image in the digital camera 2 for which transfer to the server was performed on the display unit 100 (step S1611).

Figure 17A:
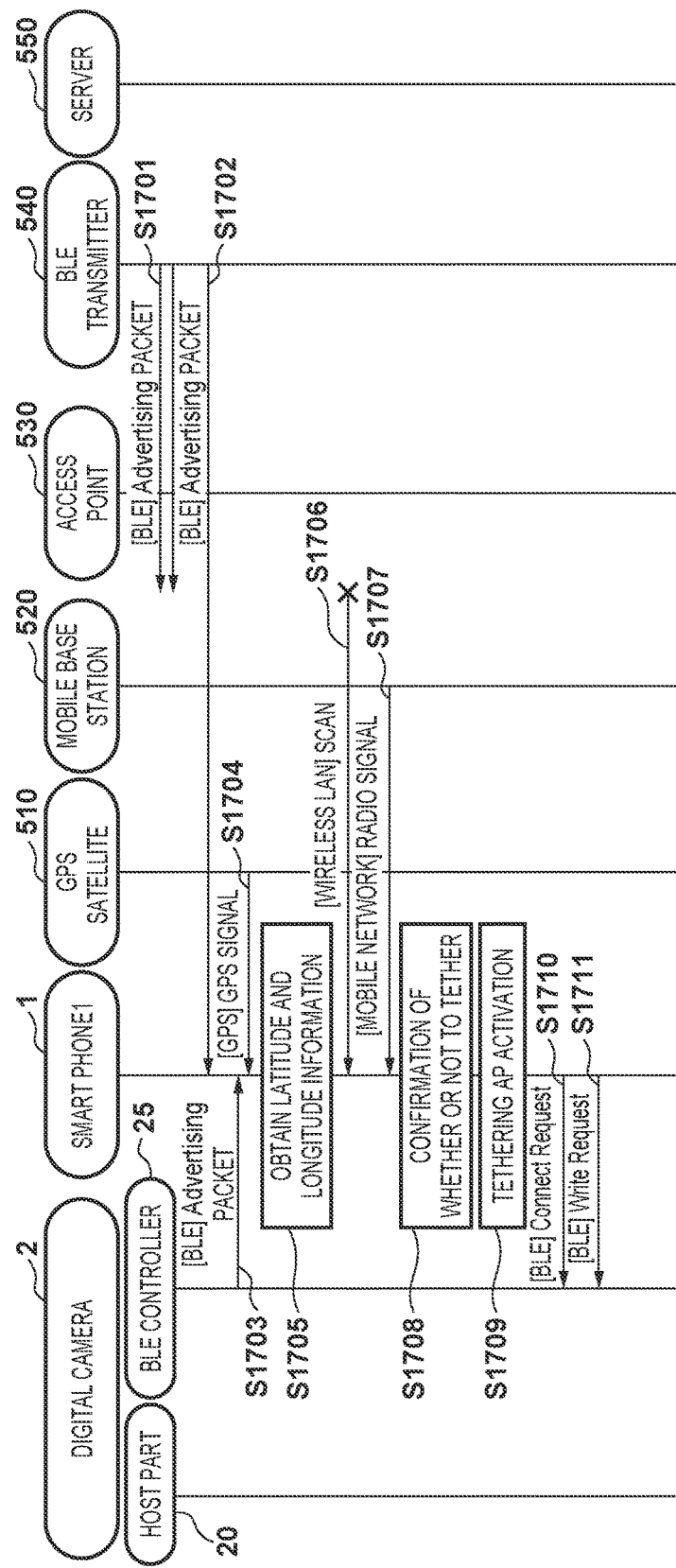
FIG. 17A-FIG. 17B illustrate exemplified sequences between each device according to the embodiment.
Figure 17B:
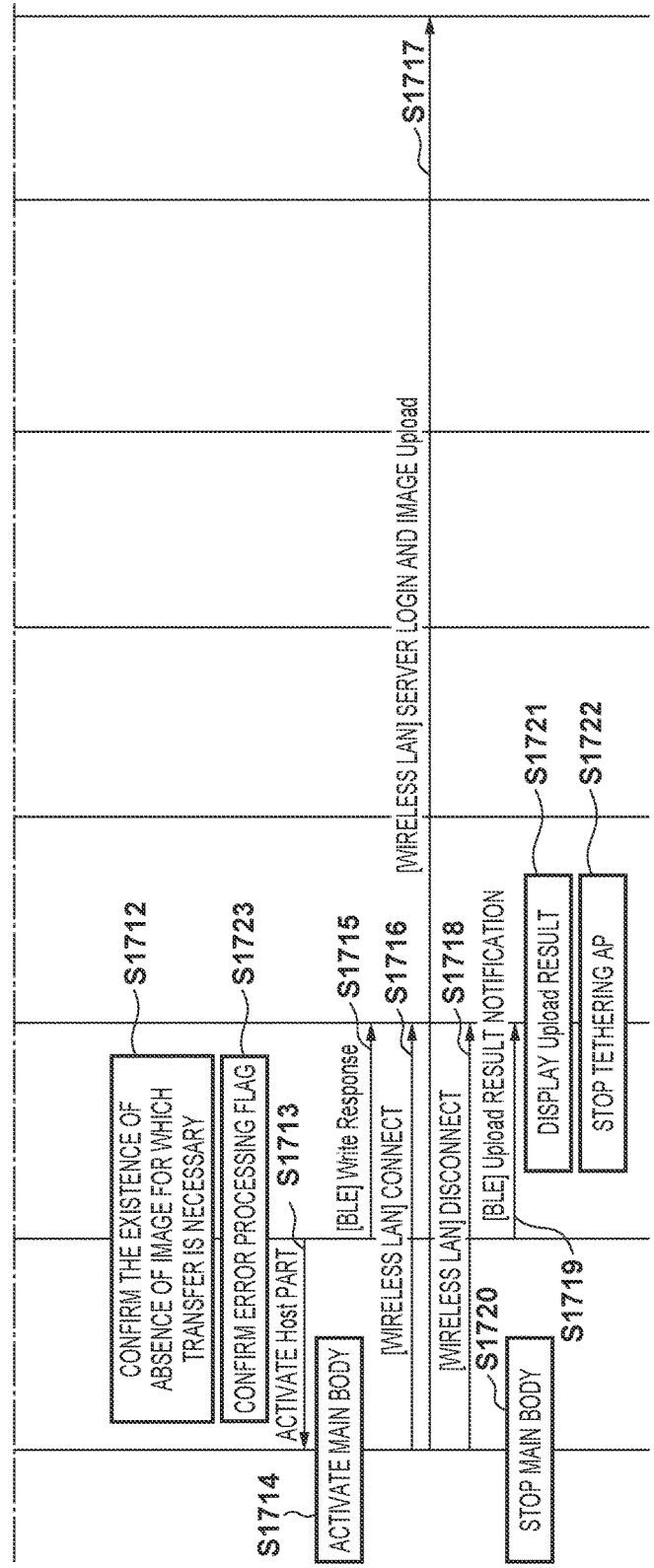

FIG. 17A-FIG. 17B illustrate exemplified communication sequences of a case when the error processing flag is cleared when there is an image for which transferring is necessary when the user holds the smart phone 1 and the digital camera 2 and returns home, and which is different to FIG. 15. In FIG. 17A-FIG. 17B an operation sequence of a case in which the access point 530 of the home due to another malfunction cannot be used is exemplified.

Since the processing of step S1701—step S1705 are the same as step S1501—step S1505 of FIG. 15, explanation will be omitted here. After the obtainment of the latitude and longitude information, although the wireless LAN communication control unit 310 of the smart phone 1 searches for the network of the access point 530, here the wireless LAN network of the access point 530 cannot be detected (step S1706). Thus, the smart phone 1, after the mobile network communication control unit 330 confirms communication with the mobile network base station 520 (step S1707), displays to the display unit 100 a message for confirming with the user whether or not to perform an automatic upload using the tethering function (step S1708). If the user performs an operation for permitting usage of the tethering function, the wireless LAN communication control unit 310 of the smart phone 1 activates the AP function to generate a wireless LAN network, and the tethering control unit 340 initiates relay processing of the mobile network communication with the wireless LAN communication (step S1709).

Subsequently, the BLE communication control unit 320 transmits a Connect Request (step S1710). Subsequently, the BLE communication control unit 320 transmits a Write Request (step S1711). Here in the Write Request, an upload request and setting information of the wireless LAN network generated in step S1709 are included. When the BLE communication control unit 420 of the digital camera 2 receives the message of step S1711, the BLE communication control unit 420 determines the existence or absence of an image for which transfer is necessary (step S1712). Next, the BLE communication control unit 420 confirms whether the error processing flag is cleared (step S1723). The BLE communication control unit 420 sets the power supply of the power supply unit 203 of the host part 20 to an ON state via the host part I/F 250 (step S1713). The power supply of the host part 20 activates (step S1714). The BLE communication control unit 420 transmits a Write Response (step S1715). Subsequently, the wireless LAN communication control unit 410 of the digital camera 2 connects to the wireless LAN network of the smart phone 1 with the settings received in step S1711 (step S1716).

Next, the upload processing unit 430 of the digital camera 2 performs processing to login to the server 550 via the wireless LAN network connected in step S1716 and processing to upload the media file (step S1717). When the upload processing completes, the wireless LAN communication processing unit of the digital camera 2 disconnects the connection with the wireless LAN network of the smart phone 1 (step S1718). Subsequently, the BLE communication control unit 420 of the digital camera 2 transmits the upload processing result to the smart phone 1 by the BLE communication (step S1719) and stops the power supply of the host part 10 (step S1720). When the BLE communication control unit 320 of the smart phone 1 receives the upload processing result (step S1719) from the digital camera 2, the smart phone 1 displays this result on the display unit 100 (step S1721). Also, the wireless LAN communication control unit 310 of the smart phone 1 stops the AP function and the tethering control unit 340 stops the processing to relay between the mobile network communication and the wireless LAN communication (step S1722).

FIG. 18 illustrates exemplified communication sequence of a case when there is no image for which transfer is necessary when a user is holding the smart phone 1 and the digital camera 2 and returns home, and which is different from FIG. 16. In FIG. 18, an operation sequence of a case in which the access point 530 of the home cannot be used due to another malfunction is exemplified.

Since step S1801—step S1811 are the same as step S1701—step S1711, explanation will be omitted here. In FIG. 18, if it is determined that there is no image for which transfer is necessary in step S1809, the BLE communication control unit 420 does not transmit the Write Response (step S1813). Then, the smart phone 1 displays a result of the upload processing request and that there was no image in which the transfer was performed in the digital camera 2 (step S1814). Also, the wireless LAN communication control unit 310 of the smart phone 1 stops the AP function, and the tethering control unit 340 stops the relay processing of the mobile network communication with the wireless LAN communication (step S1815).

Figure 19:
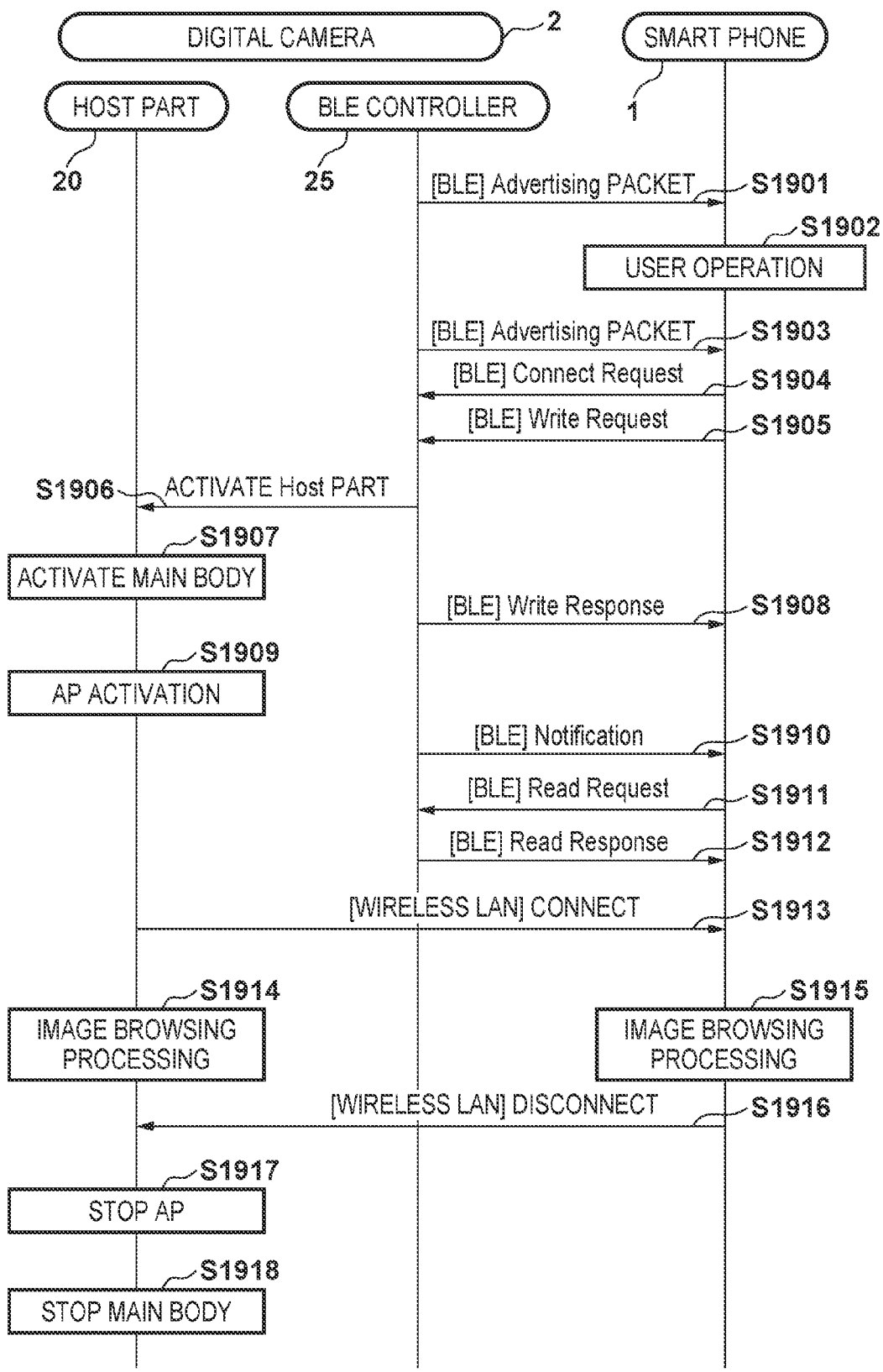
FIG. 19 illustrates an exemplified communication sequence between each device according to the embodiment.

FIG. 19 illustrates exemplified communication sequence of a case when the smart phone 1 performs a request to browse images in the digital camera 2. The BLE communication control unit 420 of the digital camera 2 transmits BLE Advertising packets periodically regardless of the power supply of the host part 20 being in an ON or OFF state (step S1901). The BLE communication control unit 320 of the smart phone 1 initiates a search for a BLE Advertising packet which was transmitted by the digital camera 2 triggered by an operation of the user in step S1902, and this is detected in step S1903. The BLE communication control unit 320 transmits a Connect Request (step S1904).

Subsequently, the BLE communication control unit 320 transmits a Write Request (step S1905). Here, an image browsing processing request is included in the Write Request. The BLE communication control unit 420 sets the power supply of the power supply unit 203 of the host part 20 to an ON state via the host part I/F 250 (step S1906). With this the power supply of the host part 20 activates (step S1907). The BLE communication control unit 420 transmits a Write Response (step S1908). The wireless LAN communication control unit 410 activates the AP function to generate the wireless LAN network (step S1909). The BLE communication control unit 420 transmits the Notification and notifies to the smart phone 1 that the AP function activated. The BLE communication control unit 320 transmits a Read Request to obtain the AP information of the digital camera 2 (step S1911). The BLE communication control unit 420 transmits the AP information of the digital camera 2 in a Read Response (step S1912).

The wireless LAN communication control unit 310 uses the network information which was transmitted from the camera to connect to the camera (step S1913). In step S1914 and in step S1915, the smart phone 1 and the digital camera 2 execute the image browsing processing. If the image browsing processing is terminated, the wireless LAN communication control unit 310 disconnects the connection with the digital camera 2 (step S1916). The wireless LAN communication control unit 410 stops the AP function (step S1917). The power supply unit 203 causes the state of the power supply to become OFF (step S1918).

Next, an explanation of an example of a method which manages whether or not there was a media file for which transfer is necessary is given using FIG. 20A-FIG. 20C. FIG. 20A-FIG. 20C are tables which illustrate whether the transfer of media data in the digital camera 2 is necessary or not. The media data management unit 440 stores a table which includes a column of media data NO. and a column of upload necessity to the storage unit 202. In the media data NO. column, numbers of the media data are stored. In the transfer necessity column, information which indicates whether or not it is necessary to transfer this media data is stored.

FIG. 20A illustrates a state in which information of the media data from media data NO. "0001" to "0006" is stored. Here, because transfer is unnecessary for the media data from data NO. "0001" to "0003", the transfer necessity column is "unnecessary". Meanwhile, because transfer is necessary for the media data from media data NO. "0003" to "0006", the transfer necessity column is "necessary". At a timing at which the media data which is imaged by the imaging unit 205 is stored in the storage unit 202, the media data management unit 440 updates the table of FIG. 20A.

FIG. 20B adds media data NO. "0007" which was imaged by the imaging unit 205. For Media data NO. "0007", the transfer necessity column is set to necessary. The control unit 206 causes the transfer necessity column to become "unnecessary" if which the transfer request is received from the smart phone 1 and the transfer succeeds (step S1012 of FIG. 10A-FIG. 10B).

FIG. 20C illustrates an example of the transfer necessity column of a case when transfer of all the media data succeeded. If the upload failed in the process of uploading (step S1022 of FIG. 10A-FIG. 10B), the transfer necessity column of media data for which the upload failed is not updated. Note, the method by which the media data management unit 440 updates the transfer necessity column is not limited to this. For example, configuration may be taken such that the transfer necessity column is updated by the user specifying media data which they wish to be transferred (transfer necessary) and media data which they do not wish to be transferred (transfer unnecessary) via operation unit 201.

The control unit 206, if there is media data for which transfer is necessary, can set a flag which represents that data for which transfer is necessary exists in the RAM 253 via a BLE control unit interface 204. As a result, it becomes possible for the BLE communication control unit 420 to determine whether or not there is a media file that is necessary to transfer simply by confirming the RAM 253 even if the power supply state of the host part 20 is OFF. Also, a BLE control unit 25, in a case when there is no media file for which transfer is necessary, can perform processing without changing the power supply of the host part 20 from the OFF state. Then, in a case when there is a media file for which transfer is necessary, the power supply of the power supply unit 203 is changed to an ON state via the host I/F 250, and it becomes possible to perform the transfer of the media file. Note that in the present embodiment, the table is used to manage whether or not there is an untransferred image, but limitation is not made to this method.

Note that although in the present embodiment, the imaging apparatus determines by a GATT layer defined by the BLE specification whether or not to execute processing in response to a handover request, that is a request to hand over to high speed communication other than the connected communication, from an external apparatus, but limitation is not made to this. For example, even if a white list which is defined by the BLE specification is used, determination of whether or not to execute the processing in response to the handover request from the external apparatus is possible. When the white list is used, the imaging apparatus in the BLE processing unit alone can ignore the Connect Request from an outside device which is included in the white list. When the processing which uses the white list is performed, if there is a media file for which transfer is necessary, the imaging apparatus registers the external apparatus to the white list. However, if there is no media file for which transfer is necessary, the imaging apparatus does not register the external apparatus to the white list. Also, if there is no media file for which transfer is necessary, the imaging apparatus deletes the external apparatus from the white list.

If such processing is performed, the imaging apparatus, in a case when there is no media file for which transfer is necessary, ignores the Connect Request since the external apparatus is not registered in the white list. As a result, the imaging apparatus can be controlled so not to execute the processing based on the handover request. Also, if there is a media file for which transfer is necessary, the imaging apparatus accepts the Connect Request since the external apparatus is registered in the white list. As a result, the imaging apparatus can be controlled so to execute the processing based on the handover request. In this way, even if the imaging apparatus uses a white list which is defined by the BLE specification, it can determine in the BLE processing unit alone whether or not to execute the processing in response to the handover request from the external apparatus.

Although the above is examples of embodiments representative of the present invention, the present invention is not limited to the embodiments illustrated in the specification and the drawings, and is something that can implemented modifying within its scope without changing its gist.

As described above, by virtue of these embodiments, it becomes possible for a digital camera, in a case in which a transfer request is received from a smart phone, to execute the transfer processing if there is an untransferred media file in the server, and to not execute the transfer processing when there is no untransferred media file. Also, it becomes possible in a configuration in which a substrate which performs BLE communication is independent of a main substrate which performs other processing, to not execute transfer processing in a case when there is no untransferred media file by only the substrate which performs BLE communication. As the result, it becomes possible to perform the processing while the power supply of the main circuit board remains in an OFF state and so power consumption can be reduced.

Additionally, it becomes possible to not execute transfer processing if there is no untransferred media file in a case where a digital camera provides a plurality of services other a transfer request, without influencing execution of other services. Additionally, it is possible to configure such that if a connection to the AP fails or if execution of the transferring fails, an error notification to the smart phone is performed, and until the smart phone performs a reset of the AP information, transfer requests are not accepted. As a result, the probability that the transfer or connection of the AP will fail is lowered, and additionally power consumption can be reduced.

Also, although the processing for uploading or browsing media files which are stored in the imaging apparatus (digital camera 2) in the embodiments described above is explained, it is possible to replace the imaging apparatus, and adopt the foregoing embodiments as a communication apparatus having a communication function but not having imaging capabilities.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-148847, filed Jul. 28, 2015 which is hereby incorporated by reference herein in its entirety.

What is claimed is:

1. A communication apparatus, comprising:
one or more processors; and
one or more memories including instructions that, when executed by the one or more processors, cause the communication apparatus to:
receive a first request signal from a first other communication apparatus by a wireless communication that complies with a first communication method;
if the first request signal is received and the communication apparatus comprises media data which has not been transmitted to an external apparatus, perform connection processing by using a wireless communication that complies with a second communication method different from the first communication method, and otherwise, not perform the connection processing; and
if the connection processing is performed transmit the media data which has not been transmitted by using the wireless communication that complies with the second communication method.

2. The communication apparatus according to claim 1, wherein the communication apparatus performs the connection processing with a second other communication apparatus different from the first other communication apparatus.

3. The communication apparatus according to claim 2, wherein the communication apparatus transmits the media data which has not been transmitted to a server via the second other communication apparatus if the connection processing is performed.

4. The communication apparatus according to claim 3, wherein the first request signal is a signal that requests the communication apparatus to transmit data to the server.

5. The communication apparatus according to claim 1, wherein the communication apparatus transmits the media data which has not been transmitted to a server via the first other communication apparatus if the connection processing is performed.

6. The communication apparatus according to claim 1, wherein the communication apparatus notifies to the first other communication apparatus by a wireless communication that complies with the first communication method failure of transmission if the communication apparatus fails at transmission of the media data which has not been transmitted.

7. The communication apparatus according to claim 1, wherein the first request signal is a signal that requests the communication apparatus to operate as a terminal apparatus.

8. The communication apparatus according to claim 1, further comprising transmitter that transmits the media data which has not been transmitted by using the wireless communication that complies with the second communication method, wherein the communication apparatus controls a power supply to the transmitter.

9. The communication apparatus according to claim 8, wherein, if the first request signal is received and the communication apparatus comprises media data which has not been transmitted to an external appratus, the communication apparatus supplies power to the transmitter, and otherwise, the communication apparatus does not supply power to the transmitter.

10. The communication apparatus according to claim 1, wherein the communication apparatus receives a second request signal from the first other communication apparatus by a wireless communication that complies with the first communication method; and
   if the second request signal is received, to display the stored media data which has not been transmitted on the first other communication apparatus, the communication apparatus transmits the media data which has not been transmitted to the first other communication apparatus by a wireless communication that complies with the second communication method.

11. The communication apparatus according to claim 1, wherein the communication apparatus discriminates whether the request signal that the communication apparatus received is the first request signal or the second request signal,
   wherein if the first request signal is discriminated, the communication apparatus performs the connection processing as a terminal apparatus, and
   if the second request signal is discriminated, the communication apparatus performs the connection processing as a base station.

12. The communication apparatus according to claim 1, wherein the first communication method is a communication method that complies with a BLE (Bluetooth Low Energy) standard.

13. The communication apparatus according to claim 1, wherein the second communication method is a communication method that complies with an IEEE 802.11 series standard.

14. A method of controlling a communication apparatus, the method comprising:
   receiving a first request signal from a first other communication apparatus by a wireless communication that complies with a first communication method;
   if the first request signal is received and the communication apparatus comprises media data which has not been transmitted to an external apparatus, performing connection processing by using a wireless communication that complies with a second communication method, and otherwise not performing the connection processing; and
   if the connection processing is performed, transmitting the media data which has not been transmitted by using the wireless communication that complies with the second communication method.

15. A non-transitory computer-readable storage medium storing a computer program for causing a computer to execute a method of an image reconstructing apparatus, the method comprising steps of:
   receiving a first request signal from a first other communication apparatus by a wireless communication that complies with a first communication method;
   if the first request signal is received and the communication apparatus has media data which has not been transmitted to an external apparatus, performing connection processing by using a wireless communication that complies with a second communication method different from the first communication method, and otherwise, not performing the connection processing; and
   if the connection processing is performed, transmitting the media data which has not been transmitted by using the wireless communication that complies with the second communication method.

* * * * *